United States Patent
Hagiwara

(10) Patent No.: US 12,455,946 B2
(45) Date of Patent: Oct. 28, 2025

(54) ABNORMALITY DETECTION APPARATUS, ABNORMALITY DETECTION SYSTEM, AND ABNORMALITY DETECTION METHOD

(71) Applicant: RENESAS ELECTRONICS CORPORATION, Tokyo (JP)

(72) Inventor: Kei Hagiwara, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 1183 days.

(21) Appl. No.: 16/783,563

(22) Filed: Feb. 6, 2020

(65) Prior Publication Data
US 2020/0264219 A1    Aug. 20, 2020

(30) Foreign Application Priority Data
Feb. 15, 2019  (JP) .................. 2019-025169

(51) Int. Cl.
| | |
|---|---|
| G06F 18/24 | (2023.01) |
| G01M 99/00 | (2011.01) |
| G01R 23/16 | (2006.01) |
| G06F 18/2433 | (2023.01) |
| G06N 3/045 | (2023.01) |
| G06N 3/08 | (2023.01) |

(52) U.S. Cl.
CPC ....... *G06F 18/2433* (2023.01); *G01M 99/005* (2013.01); *G01R 23/16* (2013.01); *G06N 3/045* (2023.01); *G06N 3/08* (2013.01); *G06F 2218/10* (2023.01); *G06F 2218/16* (2023.01)

(58) Field of Classification Search
CPC .................. G06N 3/045; G06N 3/08
See application file for complete search history.

(56) References Cited

U.S. PATENT DOCUMENTS

| | | | |
|---|---|---|---|
| 2018/0330201 A1* | 11/2018 | Witbrock | G06N 20/10 |
| 2019/0391574 A1* | 12/2019 | Cheng | G06N 3/044 |
| 2020/0076841 A1* | 3/2020 | Hajimirsadeghi | H04L 63/1408 |

(Continued)

FOREIGN PATENT DOCUMENTS

| | | |
|---|---|---|
| JP | 2008-097361 A | 4/2008 |
| JP | 2010-038884 A | 2/2010 |

(Continued)

OTHER PUBLICATIONS

Japanese Notice of Reasons for Refusal issued in corresponding Japanese Patent Application No. 2019-025169, dated Jun. 7, 2022, with English translation.

*Primary Examiner* — Van C Mang
(74) *Attorney, Agent, or Firm* — Rimon P.C.

(57) ABSTRACT

The abnormality detection device includes a first extraction unit extracting an input waveform data from a waveform data input to the first extraction unit, a first determination unit for determining whether the input waveform data includes a detection object waveform data, a second extraction unit for extracting and outputting the detection object waveform data from the input waveform data when the input waveform data is determined to include the detection object waveform data by the first determination unit; and a second determination unit for determining whether the detection target device has an abnormality based on whether the detection object waveform output from the second extraction unit indicates an abnormality.

20 Claims, 24 Drawing Sheets

(56) References Cited

U.S. PATENT DOCUMENTS

2020/0097810 A1* 3/2020 Hetherington ......... G06N 20/20
2020/0387162 A1* 12/2020 Kobayashi ........... G05D 1/0272

FOREIGN PATENT DOCUMENTS

| JP | 2016-213400 A | 12/2016 |
| JP | 2018-185256 A | 11/2018 |
| JP | 2019-020913 A | 2/2019 |

* cited by examiner

FIG. 5
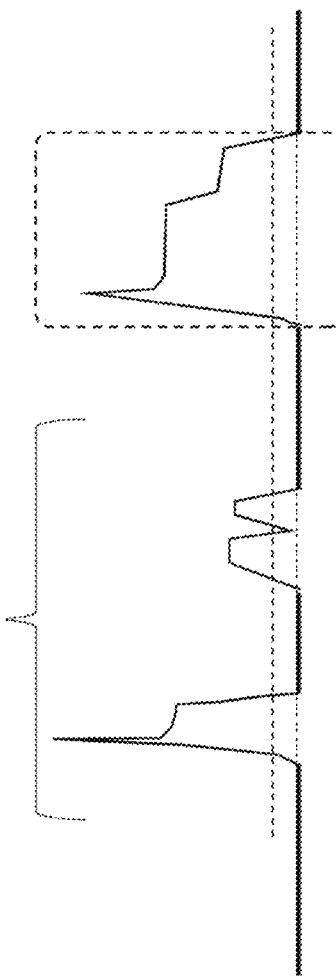
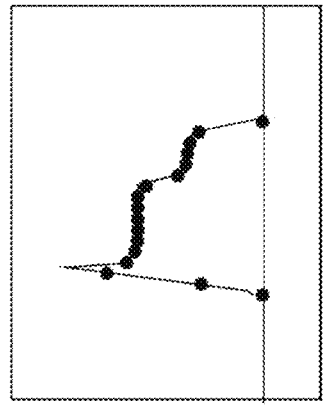
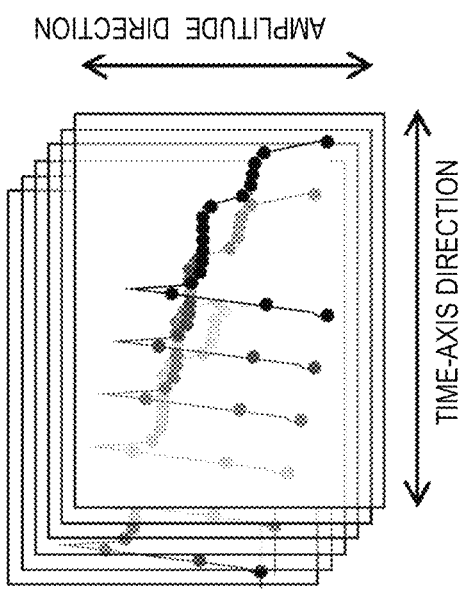

DETECTION OBJECT WAVEFORM X
→ DETERMINED TO BE INCLUDED IN
  WAVEFORM DATA BY WAVEFORM
  BY DETERMINATION UNIT #1X

DETECTION OBJECT WAVEFORM Y
→ DETERMINED TO BE INCLUDED IN
  WAVEFORM DATA BY WAVEFORM
  BY DETERMINATION UNIT #1Y

ABNORMALITY DETECTION APPARATUS, ABNORMALITY DETECTION SYSTEM, AND ABNORMALITY DETECTION METHOD

CROSS-REFERENCE TO RELATED APPLICATIONS

The disclosure of Japanese Patent Application No. 2019-025169 filed on Feb. 15, 2019 including the specification, drawings and abstract is incorporated herein by reference in its entirety.

BACKGROUND

The present invention relates to an abnormality detection device. For example, the present invention is suitably used for an abnormality detection device for judging whether or not a detection target device is abnormal using a detection object waveform included in time series waveform data outputted from a detection target device.

In a manufacturing site such as a factory, an abnormality of device, such as a manufacturing process or an operating state, is detected by monitoring a waveform of sensor data of a sensor installed in the device to be monitored.

However, at the manufacturing site, there is a request that the waveform of the sensor data of the device to be monitored is not constantly monitored, but only when the device is performing the operation to be monitored, the waveform of the sensor data is monitored.

Therefore, at the manufacturing site, the waveform when the operation to be monitored is performed is extracted as the detection object waveform out of the waveform of the sensor data of the device to be monitored. It is important to detect the abnormality of the device using the extracted detection object waveform in order to detect the abnormality more accurately.

Japanese unexamined Patent Application publication No. 2010-038884 (hereinafter to be referred to as "Patent Document 1") discloses a related technique for extracting a detection object waveform from input waveform data. According to Patent Document 1, it is detected whether or not there is a portion (trigger point) satisfying the trigger condition in the input waveform data, and if there is the portion satisfying the trigger condition, the waveform of the portion is extracted as the detection object waveform. In addition, according to Patent Document 1, the triggering condition is set based on, for example, rising/falling edges, set-up/hold time violations, Runt, transitions, and pulse widths.

SUMMARY

However, in the technique disclosed in Patent Document 1, when a waveform satisfying a trigger condition is mixed in the input waveform data even though the detection object waveform is not included in the input waveform, it is erroneously determined that the waveform is the detection object waveform.

Other objects and novel features will become apparent from the description of this specification and the accompanying drawings.

According to one embodiment, an abnormality detection determines whether or not data to be detected is included in the input time series data, identifies a detection object time series data from the input time series data when it is determined that data to be detected is included, and determines whether or not the detection object time series data is data indicating an abnormality.

According to the above-mentioned embodiment, it is possible to contribute to solving the above-mentioned problems.

BRIEF DESCRIPTION OF THE DRAWINGS

FIG. 5 is a diagram illustrating exemplary methods for generating learning data for the object waveform detection algorithm AL[1] according to the first embodiment.

DETAILED DESCRIPTION

Figure 1:
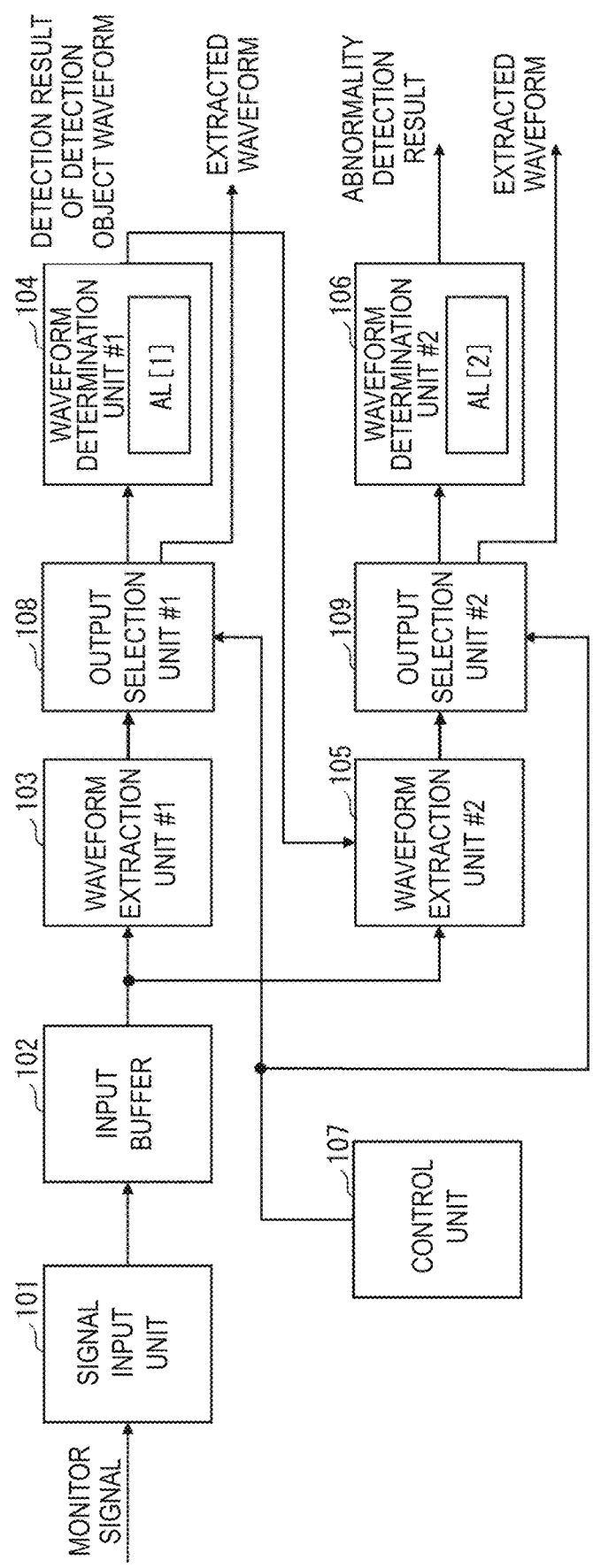
FIG. 1 is a diagram showing an exemplary configuration of an abnormality detection device according to the first embodiment.

The following description and the drawings are appropriately omitted and simplified for clarity of description. In the drawings, the same elements are denoted by the same reference numerals, and duplicate descriptions are omitted as necessary.

In addition, the elements described in the drawings as functional blocks for performing various processes can be configured by hardware such as a CPU (Central Processing Unit), a memory, and other circuits, and are realized by software such as programs loaded into the memory. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks, CD-ROM (Compact Disc-Read Only Memory), CD-R (CD-Recordable), CD-R/W (CD-ReWritable, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

First Embodiment

Configuration of First Embodiment

FIG. 1 is a diagram showing an exemplary configuration of an abnormality detection device according to the first embodiment. FIG. 1 shows the main components of the abnormality detection device, and omits other components.

The detection target device to be detected abnormality by the abnormality detection device according to the present first embodiment is assumed to be manufacturing device in the manufacturing systems for manufacturing semiconductor device. However, the present embodiment is not necessarily limited thereto, and the abnormality detection device according to the first embodiment can be applied as a device for detecting abnormalities in various manufacturing device in various manufacturing systems.

Figure 2:
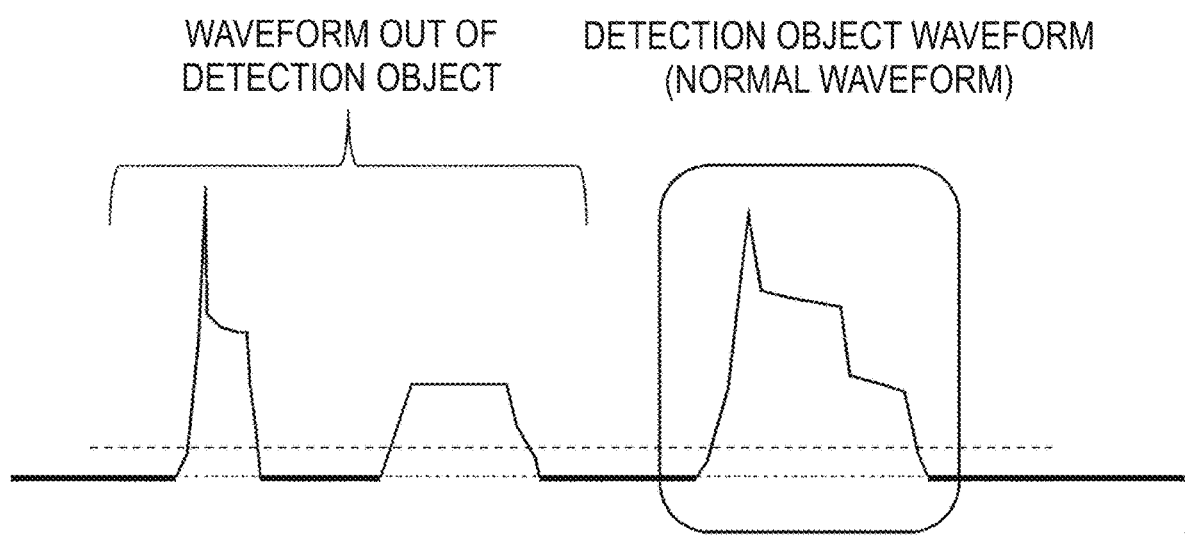
FIG. 2 is a diagram showing examples of detection object waveform related to first embodiment.
Figure 3:
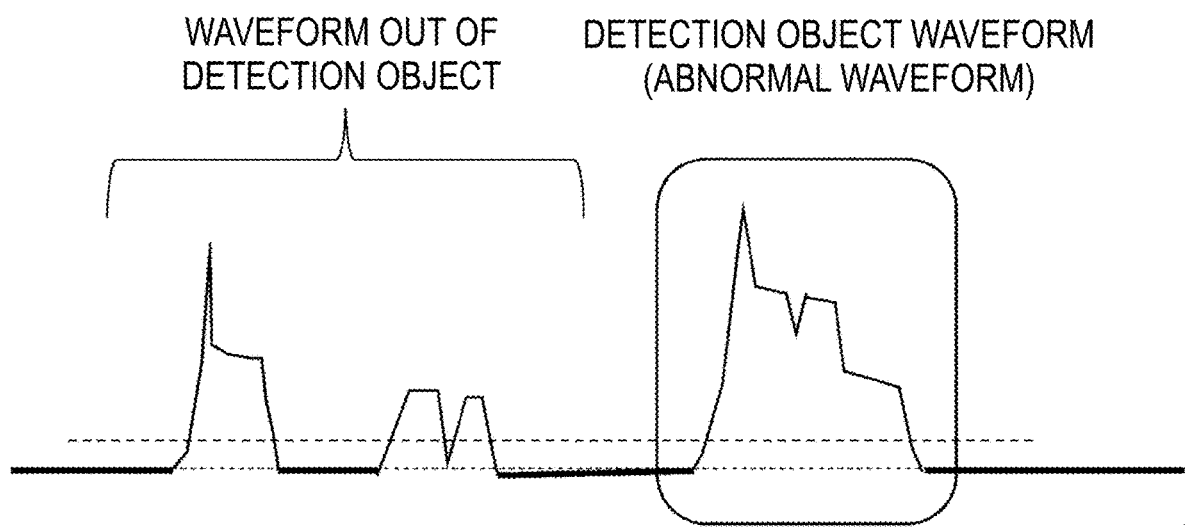
FIG. 3 is a diagram showing examples of detection object waveform related to first embodiment.

The abnormality detection device according to the first embodiment detects an abnormality of the manufacturing device based on a detection object waveform included in the time series waveform data outputted from the manufacturing device. It is assumed that there is only one detection object waveform. FIGS. 2 and 3 are diagrams showing examples of detection object waveforms according to present first embodiment. FIG. 2 shows waveform data including a non-detection object waveform and a detection object waveform (normal waveform), and FIG. 3 shows waveform data including a non-detection object waveform and a detection object waveform (abnormal waveform).

As shown in FIG. 1, the abnormality detection device according to the present first embodiment includes a signal input unit 101, an input buffer 102, a waveform extraction unit 103, an output selection unit 108, and a waveform determination unit 104, a waveform extraction unit 105, an output selection unit 109, a waveform determination unit 106, and a control unit 107. The waveform extraction unit 103 is an example of the first waveform extraction unit, the waveform determination unit 104 is an example of the first waveform determination unit, the waveform extraction unit 105 is an example of the second waveform extraction unit, and the waveform determination unit 106 is an example of the second waveform determination unit. In the drawings described below, the waveform extraction units 103 and 105 are also denoted as waveform extraction units #1 and #2, respectively, the waveform determination units 104 and 106 are also denoted as waveform determination units #1 and #2, respectively. The output selection units 108 and 109 are also denoted as output selection units #1 and #2, respectively.

The signal input unit 101 receives a monitor signal from a detection target device (in this first embodiment, manufacturing device for a semiconductor device), and performs predetermined signal processes on the input monitor signal by various filtering circuits, analog-to-digital converters, and the like, thereby generating time series waveform data. The signal input unit 101 outputs the generated waveform data to the input buffer 102. The monitor signal is a signal representing the status of the process of the manufacturing device. The monitor signal is, for example, a sensor signal from a variety of sensors provided in the manufacturing device, or a variety of sensors added to the manufacturing device. The monitor signal may be an analog signal, or may be a digital signal input to various communication means. The various sensors may be, for example, a flow rate sensor for monitoring the flow rate of gases, a pressure sensor for monitoring the pressure of the chamber, a power sensor for monitoring the RF power of plasmas, an EPD (End Point Detector) for monitoring the progress of etching, or the like, but they may be other sensors. The waveform data is described as one system, but may be a plurality of systems.

The input buffer 102 includes a ring buffer (not shown) and an output part (not shown), and copies the time series waveform data output from the signal input unit 101 to the output part after accumulating the waveform data for a predetermined period of time using the ring buffer. When N1 pieces of points in the waveform data are accumulated in the output part, the input buffer 102 outputs the the waveform data composed of N1 pieces of points to the waveform extraction unit 103 and 105. The waveform data accumulated in the output part is shifted by the number of points M. Thereafter, the input buffer 102 repeats this operation every time the N1 pieces of points in the waveform data are accumulated in the output part. Here, when the number of points of the detection object waveform is L, N1, M, and L are in a relationship of N1≥L+M. For example, N1=2*L, M=L.

The waveform extraction unit 103 receives the the waveform data composed of N1 pieces of points output from the input buffer 102, extracts the waveform data when the waveform determination unit 104 is turned into the data input waiting state, and outputs the waveform data to the output selection unit 108. Depending on the shapes of the detection object waveform or the non-detection object waveform, the waveform extraction unit 103 may thin out or compress the waveform data composed of N1 pieces of points into the waveform data composed of N2 pieces of points (N1>N2, for example, N2=N1/10) having a coarse granularity by, for example, setting the average value of every 10 points as one data. As a result, it is possible to reduce the calculation amount of the waveform determination unit 104 in the subsequent stage and to shorten the calculation time.

The output selection unit 108 outputs the waveform data output from the waveform extraction unit 103 to the waveform determination unit 104. However, when the waveform data is used for generating the object waveform detection algorithm AL [1] used in the waveform determination unit 104, the output selection unit 108 outputs the waveform data output from the waveform extraction unit 103 to the outside of the device. Outside the device, the learning data as described later is generated by using the waveform data including the detection object waveform (which may be either a normal waveform or an abnormal waveform) among the waveform data outputted from the waveform extraction unit 103. The object waveform detection algorithm AL[1] is generated using the generated learning data. The output selection unit 108 switches an output destination based on instruction by the control unit 107.

The waveform determination unit 104 determines whether or not the detection object waveform is included in the waveform data output from the waveform extraction unit 103, using the object waveform detection algorithm AL[1] based on machine learning learned in advance. The detection result of the detection object waveform is output to the waveform extraction unit 105.

The detection object waveform are often specified by the knowledge of engineers who manage the manufacturing device. However, when the engineer designates the detection object waveform, it is necessary to manually extract and collect a large amount of learning data for generating the object waveform detection algorithm AL[1]. However, the collection of such learning data is very labor-intensive and time-consuming.

Therefore, in the first embodiment, a small number (at least one set) of waveform data obtained by manually cutting out only the detection object waveform from the waveform data outputted from the waveform extraction unit 103 is prepared outside the device. The program executed on the PC (Personal Computer) automatically generates waveform data obtained by randomly shifting the cut-out detection object waveform in the time-axis direction within a range of about twice the number of points of the detection object waveform, and sets the waveform data as learning data for the object waveform detection algorithm AL[1]. When there are variations in the amplitude direction and the time axis direction of the detection object waveform, waveform data obtained by randomly expanding and contracting the detection object waveform in the amplitude direction and the time axis direction, respectively, in an assumed normal range is generated, and this is also used as learning data for the object waveform detection algorithm AL[1]. Then, outside the device, the generated set of waveform data is used as the learning data to generate the object waveform detection algorithm AL[1].

The object waveform detection algorithm AL[1] may be, for example, an algorithm using a auto encoder which is one of the neural network (NN) techniques. The auto encoder has an input layer, one or more intermediate layers and an output layer having the same number of nodes as the input layer. The auto encoder is a method of learning a characteristic point compressed so that the input data and the output data are equal to each other using the error back propagation method. Therefore, when the waveform data included in the learning data is input to the input layer, the waveform data similar to the waveform data input to the input layer is reproduced on the output layer. Conversely, when waveform data having a component not included in the learning data is input to the input layer, waveform data similar to the input waveform data cannot be reproduced, and thus the waveform data differs between the input and the output.

The object waveform detection algorithm AL[1] further determines whether or not the degree of deviation between the input waveform data and the output waveform data of the auto encoder is equal to or less than a predetermined first degree of deviation threshold value, and determines whether or not the detection object waveform is included in the waveform data based on the determination result. Here, if the degree of deviation is equal to or smaller than the first degree of deviation threshold, it is determined that the detection object waveform is included. Here, as the degree of deviation, a Euclidean distance or the like may be used. The Euclidean distance d between the input waveform data x(i) and the output waveform data y(i) of the auto encoder is given by the following equation.

$$d = \sqrt{\Sigma_i (x(i) - y(i))^2}$$ [Equation 1]

As the object waveform detection algorithm AL[1], a method using a classification-type neural network such as a convolution neural network (CNN) is also conceivable.

The object waveform detection algorithm AL[1] continues the determination operation continuously. Therefore, by reducing the number of input nodes of the waveform determination unit 104, that is, the number of N2 points of the waveform data, it is possible to suppress the amount of calculation during normal operation in which the detection object waveform is determined by the object waveform detection algorithm AL[1], and to suppress the power consumed by the abnormality detection device. In addition, since the calculation time can be shortened, the waveform determination unit 104 can be realized even with an arithmetic unit having a low processing capacity.

The waveform extraction unit 105 inputs the waveform data composed of N1 pieces of points from the input buffer 102. When the waveform extraction unit 105 receives the detection result of the detection object waveform indicated that the input waveform data includes the detection object waveform, from the waveform detection unit 104, the waveform extraction unit 105 precisely extracts the detection object waveform having an appropriate number of points from the input waveform data by using a trigger condition that the amplitude level of the waveform data is more than a predetermined signal level (trigger level). The waveform extraction unit 105 outputs the extracted waveform data of the detection object waveform to the output selection unit 109.

The output selection unit 109 outputs the waveform data of the detection object waveform output from the waveform extraction unit 105 to the waveform determination unit 106. However, when the waveform data is used to generate an anomality detection algorithm AL[2], which will be described later, used by the waveform determination unit 106, the output selection unit 109 outputs the waveform data of the detection object waveform output from the waveform extraction unit 105 to the outside of the device. Outside the device, the abnormal detection algorithm AL[2] is generated by using the waveform data of the detection object waveform, which is a normal waveform, among the waveform data of the detection object waveform outputted from the waveform extraction unit 105, as the learning data. The output selection unit 109 switches an output destination based on instruction by the control unit 107.

The waveform determination unit 106 determines whether or not the detection object waveform outputted from the waveform extraction unit 105 is an abnormal waveform by using the abnormality detection algorithm AL[2] based on the mechanical learning learned in advance, and determines whether or not the manufacturing device has an abnormality. Here, if the detection object waveform is an abnormal waveform, it is determined that the manufacturing device has the abnormality. An abnormality detection result indicating whether the manufacturing device has the abnormality is outputted to the outside of the device. These abnormalities relate to products and manufacturing processes manufactured in device, and the operating conditions of the device themselves.

As described above, the learning data for generating the abnormality detection algorithm AL[2] is collected from the waveform data output from the waveform extraction unit 105. Therefore, learning data is efficiently prepared. The abnormality detection algorithm AL[2] may be, for example, an algorithm using a auto encoder. When the auto encoder is used, in the abnormality detection algorithm AL[2], waveform data of the detection object waveform output from the waveform extraction unit 105 is input to the auto encoder, it is determined whether or not the degree of deviation between the input waveform data and the output waveform data is equal to or less than a predetermined second degree of deviation threshold, and it is determined whether or not the detection object waveform is an abnormal waveform based on the determination result. Here, if the degree of deviation is equal to or less than the second degree of deviation threshold, it is determined that the detection object waveform is not an abnormal waveform but a normal waveform.

As described above, the waveform determination unit 104 determines whether or not the input waveform data extracted by the input buffer 102 includes the detection object waveform, and the waveform determination unit 106 performs abnormality determination on the input waveform data determined to include the detection object waveform.

Operation of First Embodiment

Figure 4:
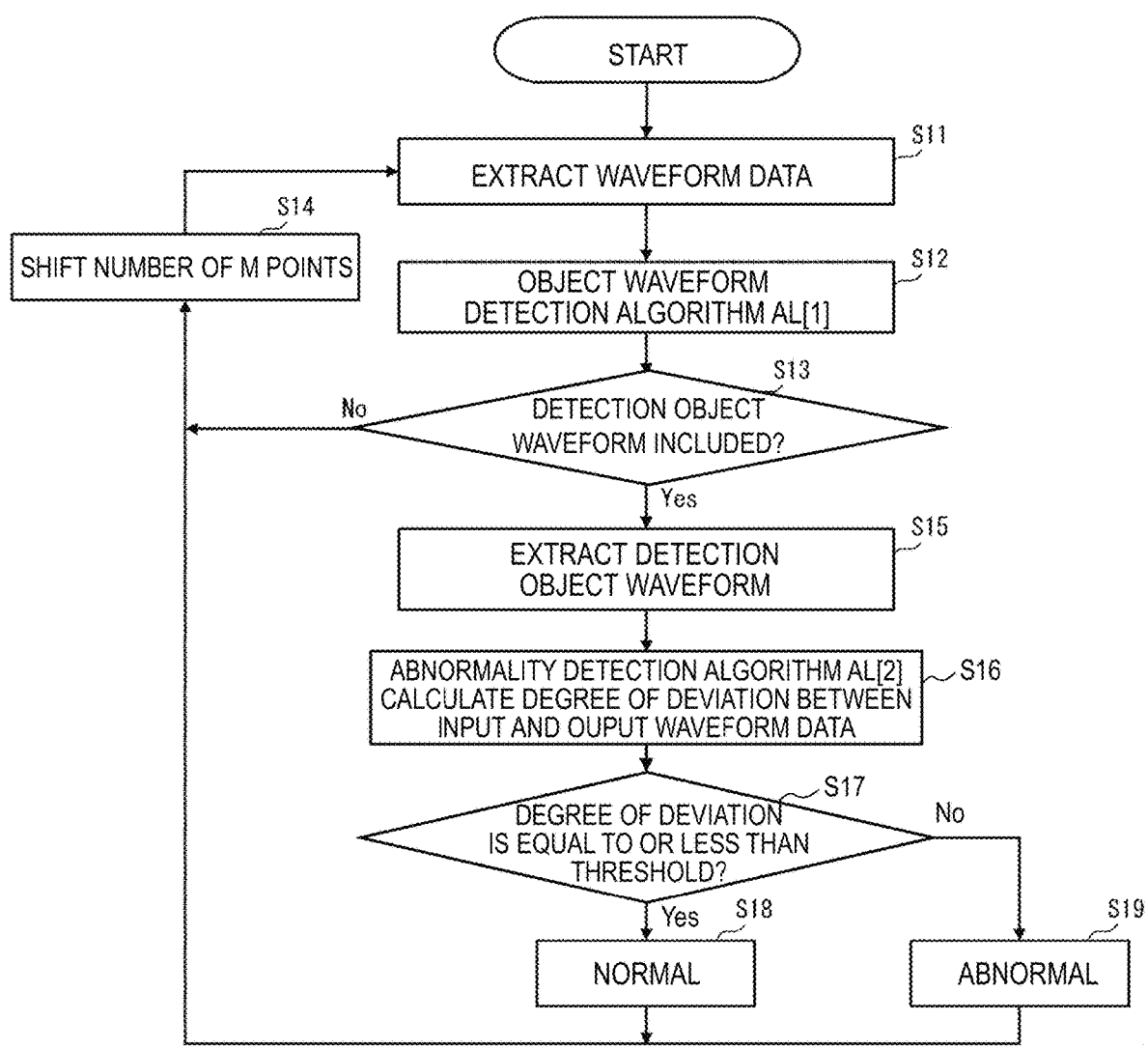
FIG. 4 is a flow chart showing an exemplary flow of an abnormality detection process according to the first embodiment.

Hereinafter, an operation of the abnormality detection device according to the present first embodiment will be described.
Abnormality Detection Process FIG. 4 is a flowchart showing an exemplary flow of an abnormality detection process performed by the entire abnormality detection device according to first embodiment. As shown in FIG. 4, when N1 pieces of points in the waveform data are accumulated in the output part of the input buffer 102, the input buffer 102 outputs the waveform data composed of N1 pieces of points to the waveform extraction unit 103 and 105. In step S11, the waveform extraction unit 103 extracts the waveform data composed of N1 pieces of points output from the input buffer 102 and outputs the waveform data to the waveform determination unit 104 via the output selection unit 108. In this instance, the waveform extraction unit 103 may thin out the waveform data composed of N1 pieces of points to become the waveform data composed of N2 pieces of points (N1>N2).

Subsequently, the waveform determination unit 104 inputs the waveform data output from the waveform extraction unit 103 to the auto encoder using the object waveform detection algorithm AL[1], and calculates the degree of deviation between the waveform data input and output to the auto encoder. In steps S12 and S13, the waveform determination unit 104 determines whether the waveform data includes a detection object waveform based on the calculated degree of deviation. In this instance, when the degree of deviation is equal to or less than the first degree of deviation threshold, the waveform determination unit 104 determines that the detection object waveform is included.

When it is determined by the waveform determination unit 104 that the detection object waveform is not included (No in step S13), the input buffer 102 shifts the waveform data in the output unit of the input buffer 102 by the number of M points (step S14), and the process returns to step S11.

On the other hand, when the waveform determination unit 104 determines that the detection object waveform is included (Yes in step S13), the waveform extraction unit 105 precisely extracts the detection object waveform from the N1 points of waveform data output from the input buffer 102 by using the trigger condition or the like, and outputs the detection object waveform to the waveform determination unit 106 via the output selection unit 109 (step S15).

Subsequently, the waveform determination unit 106 inputs the waveform data of the detection object waveform output from the waveform extraction unit 105 to the auto encoder by using the abnormality detection algorithm AL[2], and calculates the degree of deviation of the waveform data between the input and output of the auto encoder (step S16). Next, the waveform determination unit 106 determines whether or not the degree of deviation is equal to or less than the second degree of deviation threshold using the abnormality detection algorithm AL[2] (step S17), and determines that the manufacturing device is normal (step S18) when the degree of deviation is equal to or less than the second degree of deviation threshold (Yes in step S17), and determines that the manufacturing device has the abnormality (step S19) when the degree of deviation exceeds the second degree of deviation threshold (No in step S17). Thereafter, the process returns to step S11 through step S14.
Method of Generating Learning Data for Object Waveform Detection Algorithm AL[1]

FIG. 5 is a diagram illustrating an example of a method of generating learning data for the object waveform detection algorithm AL[1] according to present first embodiment. Here, it is assumed that the generating of the learning data is performed by engineers on PCs outside the device, but is not limited thereto, and an algorithm generation unit provided outside the device may generate the learning data.

As shown in FIG. 5, first, the waveform portion of the detection object waveform is extracted from the waveform data including the detection object waveform out of the waveform data output from the waveform extraction unit 103. Here, the detection object waveform is a normal waveform, but may be an abnormal waveform. Subsequently, waveform data obtained by randomly shifting the extracted detection object waveform in the time axis direction within the range of the number of points of about twice the detection object waveform is automatically generated by a program executed on the PC.

Here, as described above, depending on the shapes of the detection object waveform and the non-detection object waveform, the waveform extraction unit 103 may thin out the waveform data composed of N1 pieces of points input from the input buffer 102 to become the waveform data composed of N2 pieces of points, with coarse granularity (N1>N2). In this case, waveform data randomly shifted in the time axis direction is generated based on the waveform data thinned out by the waveform extraction unit 103. In other words, the automatically generated waveform data has the same granularity as the waveform data output from the waveform extraction unit 103.

Subsequently, when there are variations in the amplitude direction and the time axis direction of the detection object waveform, waveform data obtained by randomly expanding and contracting the detection object waveform in the amplitude direction and the time axis direction, respectively, are also generated in the assumed normal range. The set of waveform data generated above is used as learning data for the object waveform detection algorithm AL[1].

Operation of the Input Buffer 102

Figure 6:
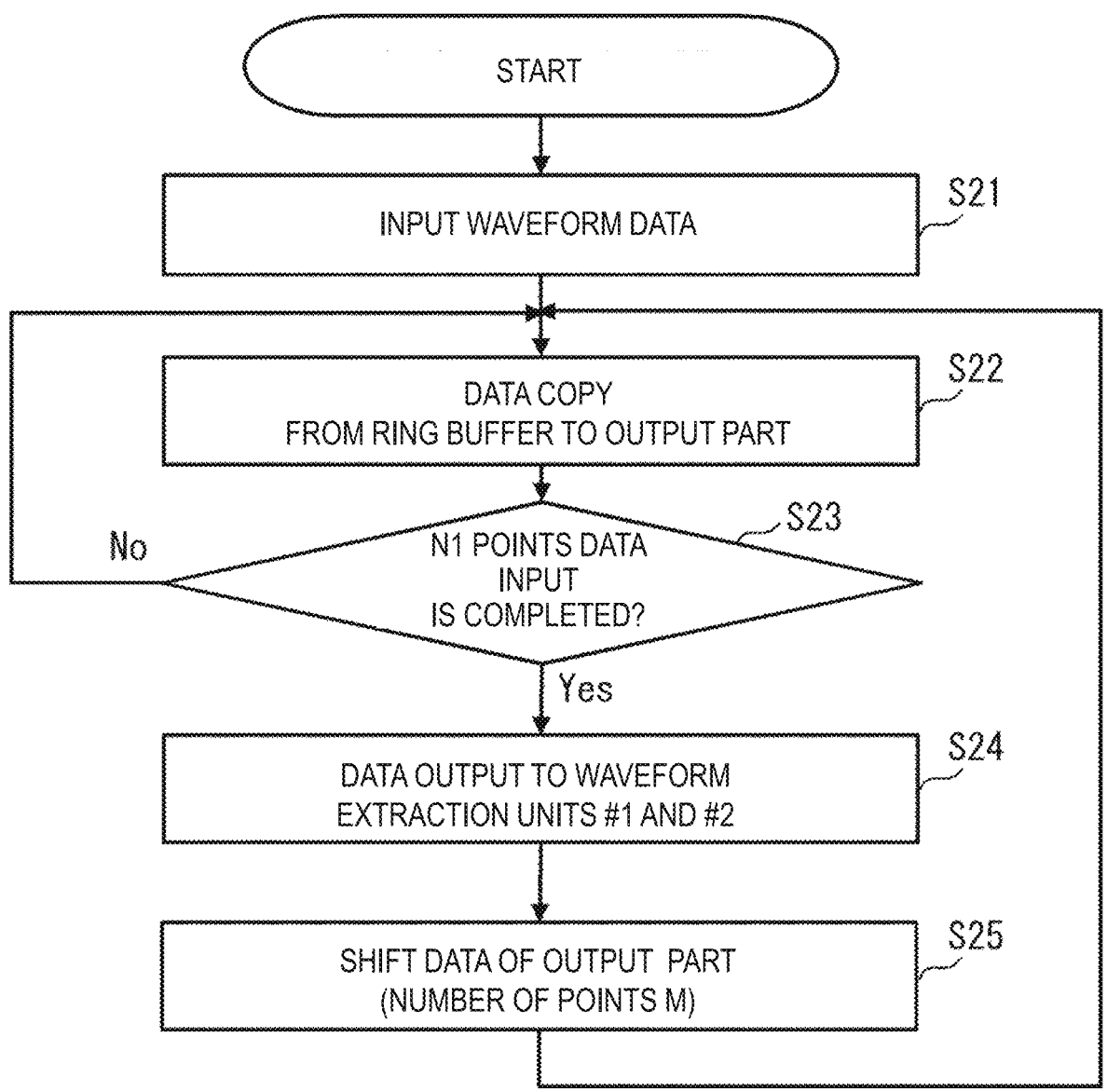
FIG. 6 is a flow chart showing an exemplary operation flow of the input buffer according to the first embodiment.

FIG. 6 is a flow diagram showing an example of the operation flow of the input buffer 102 according to first embodiment. As shown in FIG. 6, the input buffer 102 receives waveform data output from the signal input unit 101 (step S21), accumulates the input waveform data for a predetermined period of time using the ring buffer, and copies the waveform data to the output part (step S22).

When N1 pieces of points in the waveform data are accumulated in the output part, that is, when the input of the waveform data composed of N1 pieces of points is completed (Yes in step S23), the input buffer 102 outputs the waveform data composed of N1 pieces of points to the waveform extraction units 103 and 105 (step S24). In step S25, the input buffer 102 shifts the waveform data in the output part by number of points M. Thereafter, the process returns to step S22.

Figure 7:
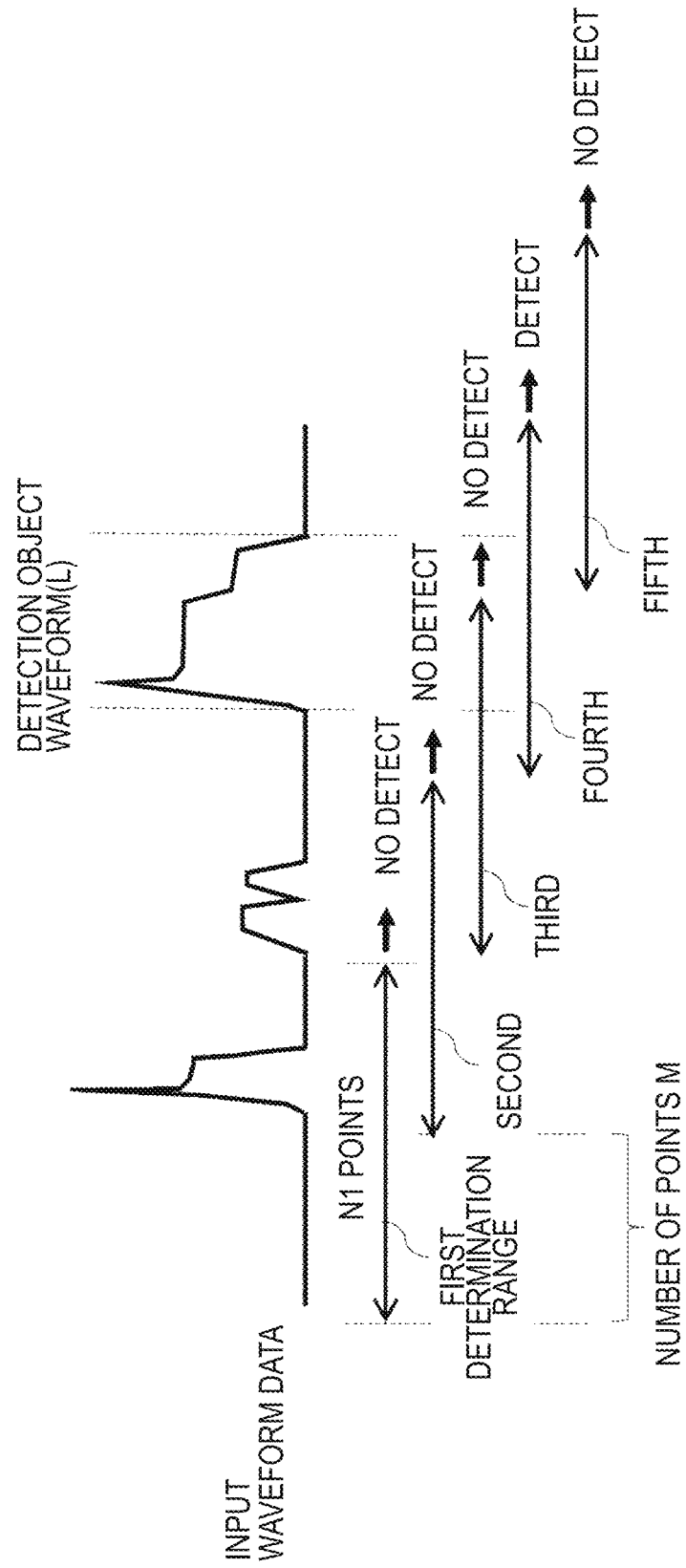
FIG. 7 is an image diagram showing examples of relationships among N1, M, and L relating to first embodiment.

FIG. 7 is an image diagram showing an example of relationships among N1, M, and L when the number of points of a detection object waveform is L. N1, M, and L shall be the relationship of N1≥L+M. In the example of FIG. 7, N1=2*L and M=L. However, in the case where the waveform fluctuation of the non-detection object waveform is large before and after the detection object waveform, it is necessary to set N1 to a value slightly larger than L.

Further, in the example of FIG. 7, the input buffer 102 outputs waveform data composed of the N1 pieces of points to the waveform extraction units 103 and 105 five times. Of these, the fourth waveform data includes the detection object waveform. Therefore, the waveform determination unit 104 of the subsequent stage determines that the fourth waveform data includes the detection object waveform.

Operation of the Waveform Extraction Unit 103

Figure 8:
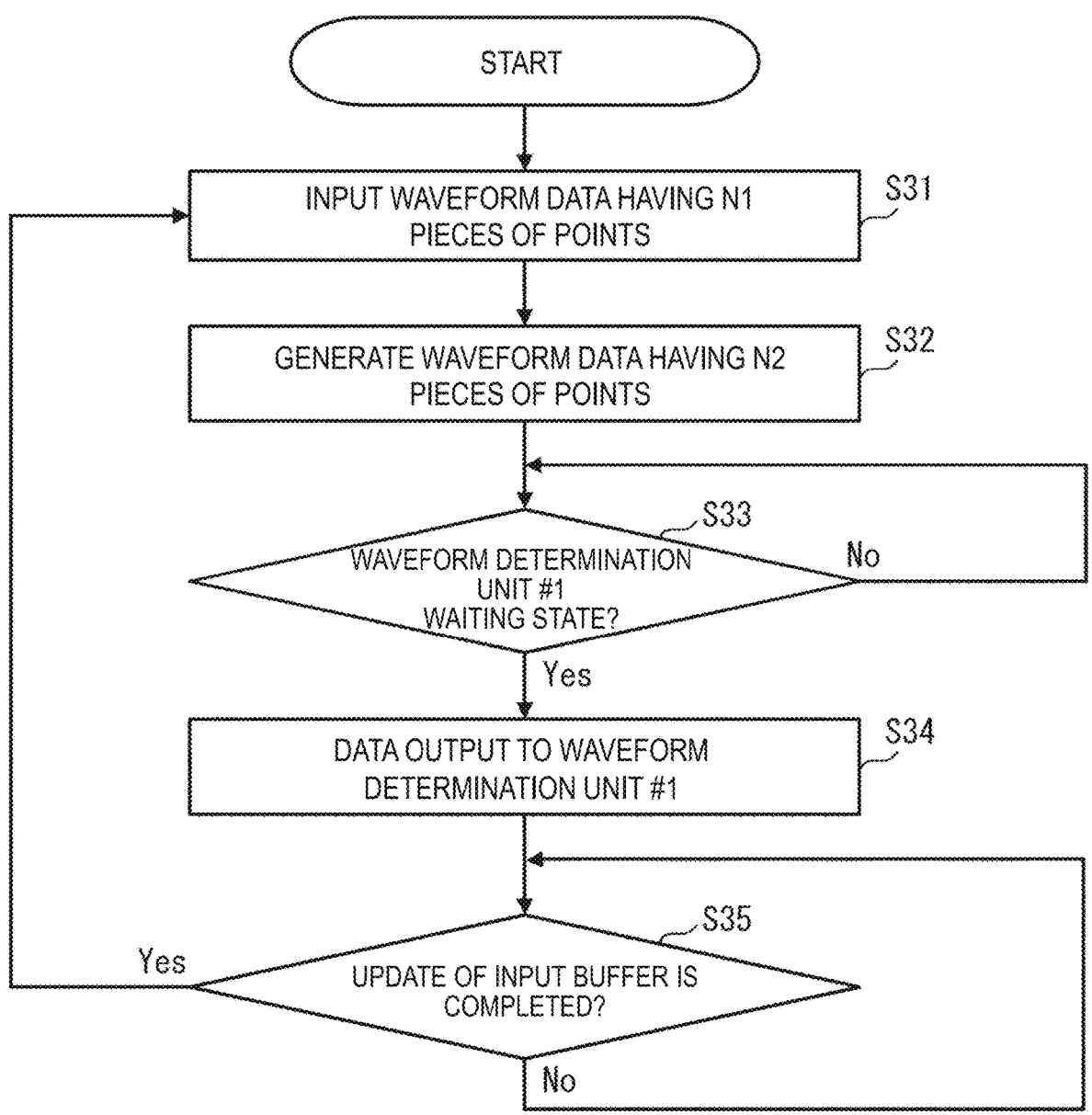
FIG. 8 is a flow chart showing an exemplary operation flow of the waveform extraction unit according to the first embodiment.

FIG. 8 is a flow diagram showing an example of the operation flow of the waveform extraction unit 103 according to the present first embodiment. As shown in FIG. 8, the waveform extraction unit 103 inputs waveform data composed of the N1 pieces of points output from the input buffer 102 in step S31.

Here, for example, in the case where the shapes of the detection object waveform and the non-detection object waveform are largely different from each other, it is also possible to classify them using an outline. Here, it is assumed that the shapes of the detection object waveform and the non-detection object waveform are largely different. Therefore, the waveform extraction unit 103 generates the waveform data composed of N2 pieces of points (N1>N2) with coarse granularity from the waveform data composed of N1 pieces of points (step S32). This makes it possible to reduce the calculation amount of the waveform determination unit 104 and to shorten the calculation time. As the calculation for generating the waveform data composed of N2 pieces of points, for example, it is possible to use various processes such as thinning process, in which the average value of every 10 points is used as one data, the value of one point every 10 points (in either case, N2=N 1/10) is used as one data, or linear interpolation between the data of two points is used.

Subsequently, the waveform extraction unit 103 waits until the waveform determination unit 104 turns into a waveform data input waiting state (step S33). When it becomes a waiting state (Yes in step S33), the waveform data composed of N2 pieces of points, through the output selection unit 108, is output to the waveform determination unit 104 (step S34). Next, in step S35, the waveform extraction unit 103 waits until the N1 pieces of points in the waveform data are accumulated in the output part of the input buffer 102, that is, until the update of the input buffer 102 is completed. If the update of the input buffer 102 has been completed (Yes in step S35), the process returns to step S31.

Figure 9:
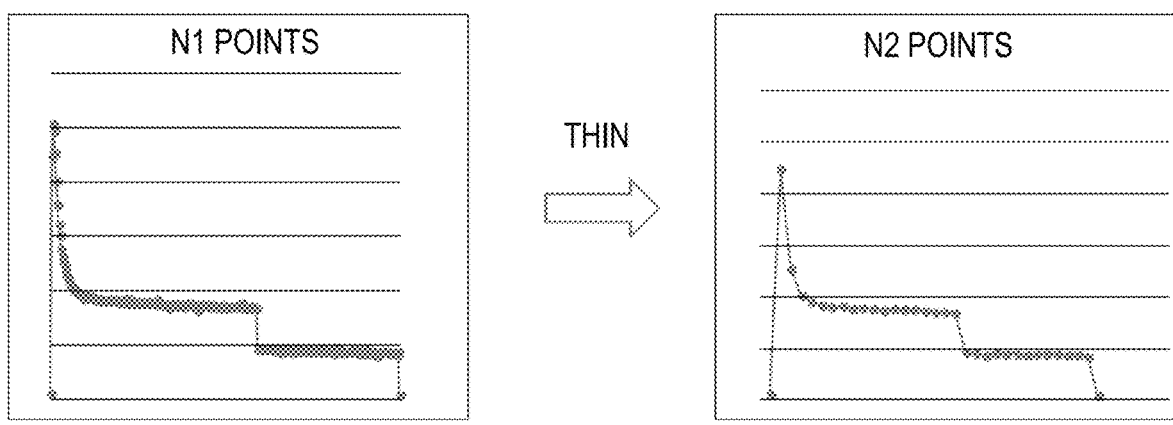
FIG. 9 is a diagram illustrating an exemplary waveform data thinning process performed by the waveform extraction unit according to the first embodiment.

FIG. 9 is an image diagram illustrating an exemplary waveform data thinning process performed by the waveform extraction unit 103 according to first embodiment. In the example of FIG. 9, the waveform extraction unit 103 generates waveform data composed of the N2 pieces of points (N2=N1/10) by using a value of one point every 10 points for the waveform data composed of the N1 pieces of points.

Operation of the Waveform Determination Unit 104

Figure 10:
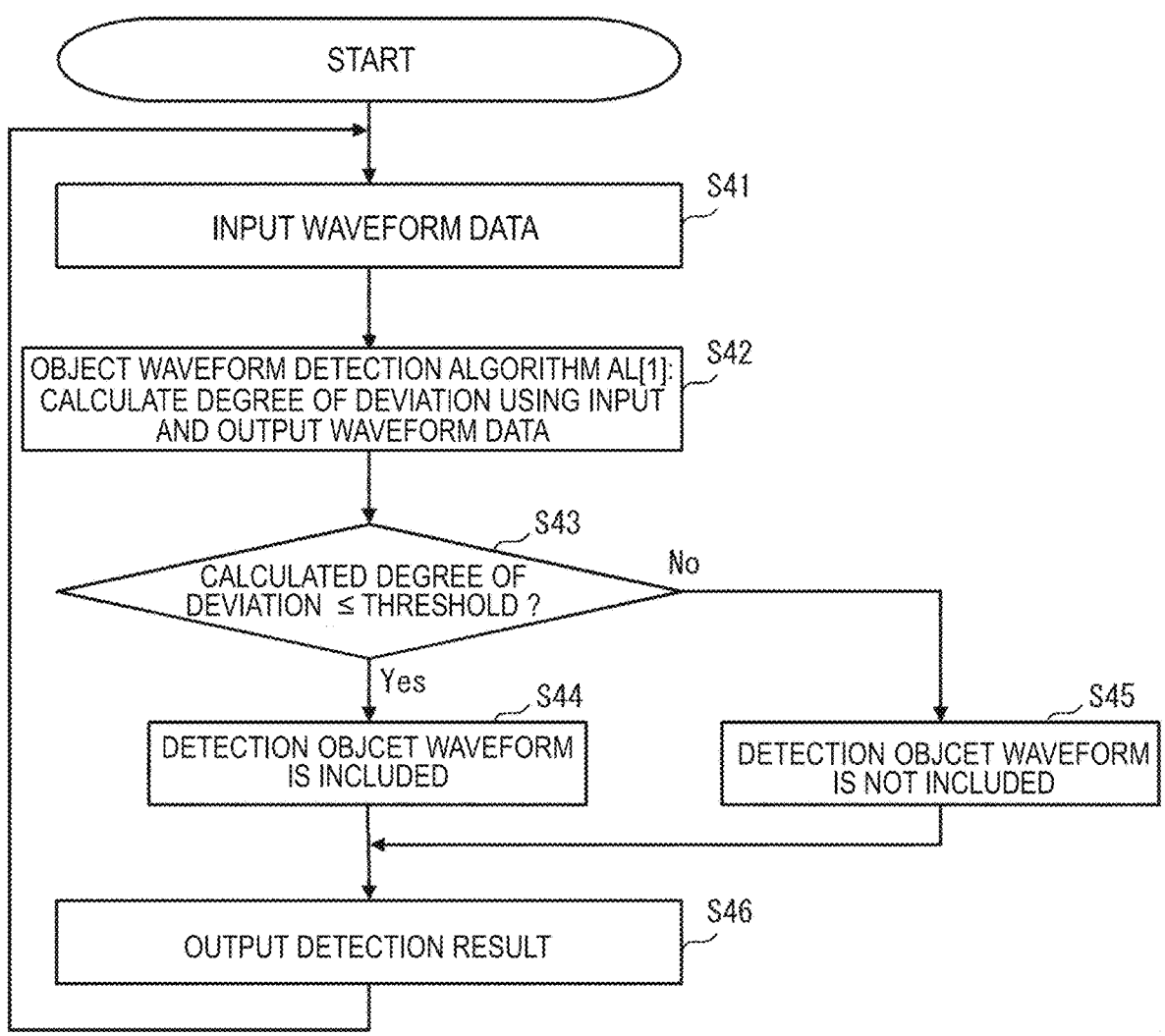
FIG. 10 is a flow chart showing an exemplary operation flow of the waveform determination unit according to the first embodiment.

FIG. 10 is a flow diagram showing an example of the operation flow of the waveform determination unit 104 according to first embodiment. As shown in FIG. 10, the waveform determination unit 104 inputs the waveform data output from the waveform extraction unit 103 in step S41. Thereafter, the waveform determination unit 104 determines whether or not the detection object waveform is included in the waveform data output from the waveform extraction unit 103 using the object waveform detection algorithm AL[1] based on the machine learning learned in advance, and outputs the detection result of the detection object waveform indicating whether or not the detection object waveform is included in the waveform data to the waveform extraction unit 105.

As described with reference to FIG. 5, the learning data for generating the object waveform detection algorithm AL[1] is generated using the waveform data output from the waveform extraction unit 103. As the object waveform detection algorithm AL[1], for example, there is a method of using a auto encoder which is one of neural network techniques. Hereinafter, the flow after step S42 will be described on the assumption that a auto encoder is used as the object waveform detection algorithm AL[1].

In step S42, the waveform determination unit 104 inputs the waveform data output from the waveform extraction unit 103 to the auto encoder and calculates the degree of deviation of the waveform data input and output to the auto encoder by using the object waveform detection algorithm AL[1], Subsequently, the waveform determination unit 104 determines whether or not the degree of deviation is equal to or less than the first degree of deviation threshold (step S43), when the degree of deviation is equal to or less than the first degree of deviation threshold (Yes in step S43), determines that the detection object waveform is included in the waveform data (step S44), and when the degree of deviation exceeds the first degree of deviation threshold (No in step S43), determines that the detection object waveform is not included in the waveform data (step S45).

Next, in step S46, the waveform determination unit 104 outputs a detection result of the detection object waveform indicating whether the waveform data includes a detection object waveform to the waveform extraction unit 105. Thereafter, the process returns to step S41.

Operation of the Waveform Extraction Unit 105

Figure 11:
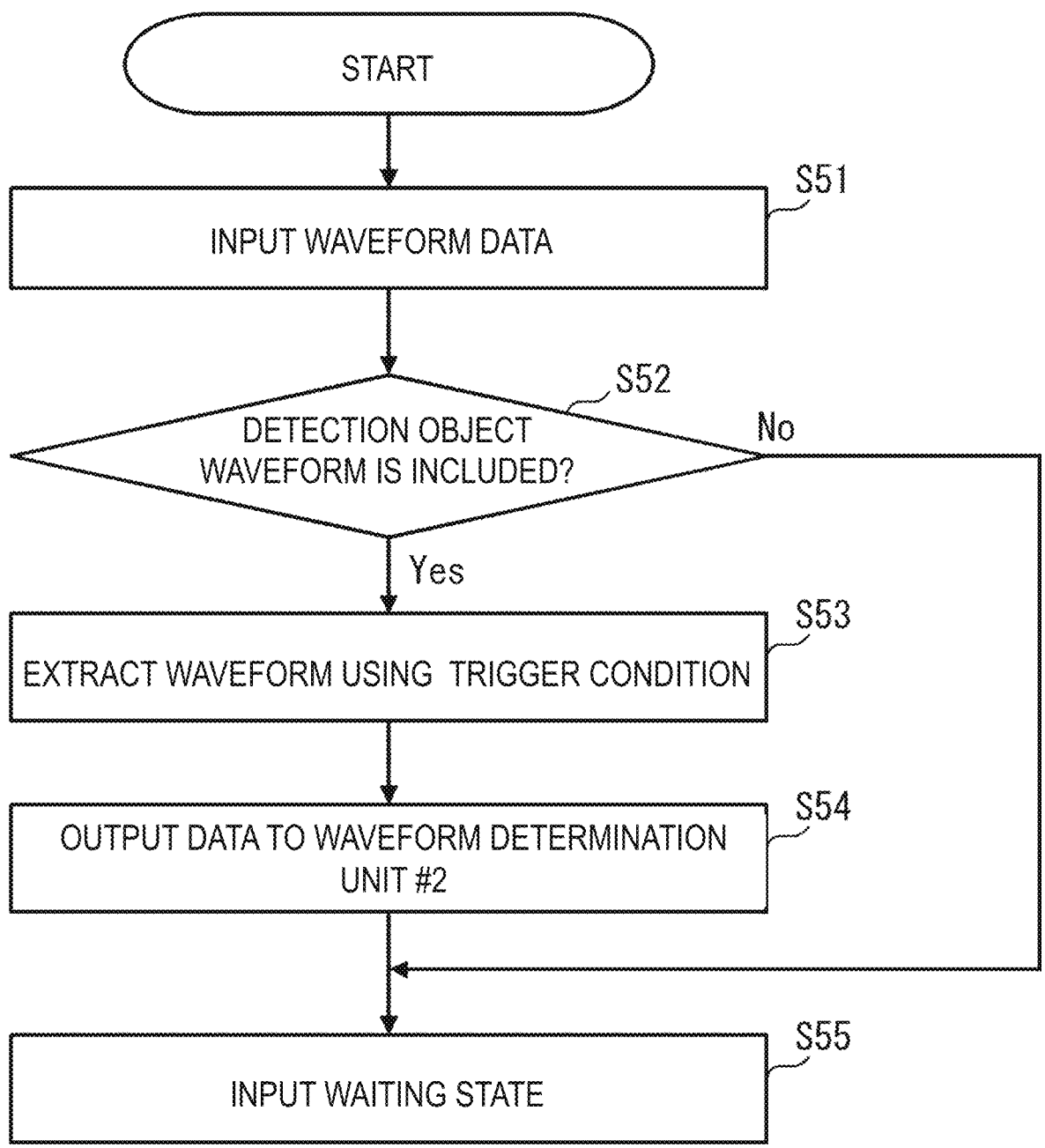
FIG. 11 is a flow chart showing an exemplary operation flow of the waveform extraction unit according to the first embodiment.

FIG. 11 is a flow diagram showing an example of the operation flow of the waveform extraction unit 105 according to the first embodiment. As shown in FIG. 11, the waveform extraction unit 105 inputs the waveform data output from the input buffer 102 in step S51. Next, the waveform extraction unit 105 confirms whether or not the waveform determination unit 104 determines that the detection object waveform is included in the waveform data input from the input buffer 102 based on the detection result of detection object waveform output from the waveform determination unit 104 in step S52.

When the waveform determination unit 104 determines that the detection object waveform is included (Yes in step S52), the waveform extraction unit 105 extracts only the detection object waveform from the waveform data input from the input buffer 102 using a trigger condition or the like for extracting the detection object waveform (step S53), and outputs the waveform data of the extracted detection object waveform to the waveform determination unit 106 via the output selection unit 109 (step S54). Thereafter, the waveform extraction unit 105 shifts to a state waiting for input of waveform data from the input buffer 102 in step S55.

On the other hand, when it is determined by the waveform determination unit 104 that the detection object waveform is not included (No in step S52), the waveform extraction unit 105 discards the waveform data input from the input buffer 102, and transitions to the input waiting state of the waveform data from the input buffer 102 (step S55).

Figure 12:
FIG. 12 is an image diagram illustrating an exemplary process of extracting a detection object waveform by the waveform extraction unit according to the first embodiment.

FIG. 12 is an image diagram showing an exemplary detection object waveform extraction process by the waveform extraction unit 105 according to the first embodiment. In the example of FIG. 12, the waveform extraction unit 105 precisely extracts the detection object waveform with an appropriate number of points by using a trigger condition that the amplitude level of the detection object waveform exceeds a predetermined signal level.

Operation of the Waveform Determination Unit 106

Figure 13:
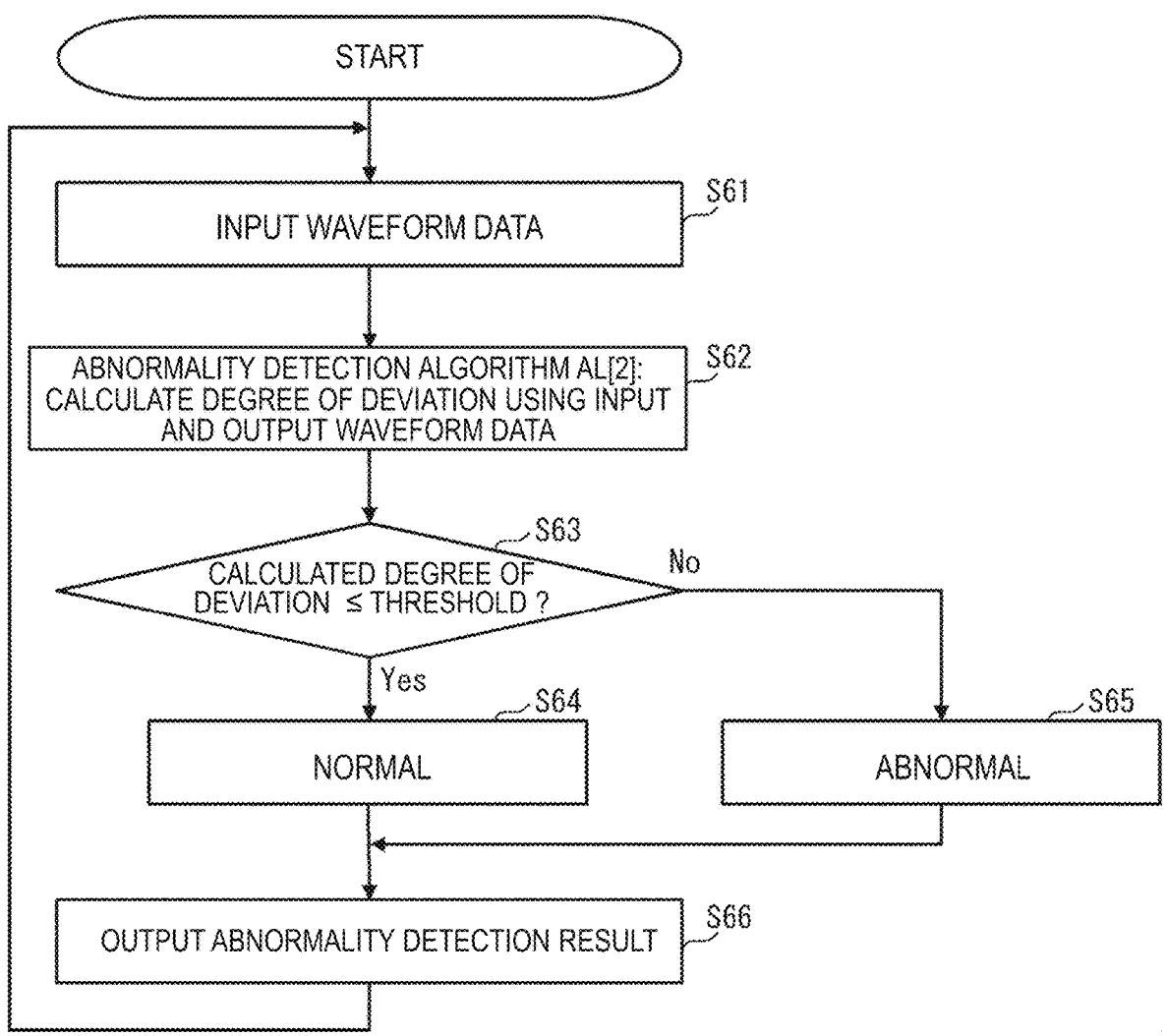
FIG. 13 is a flow chart showing an exemplary operation flow of the waveform determination unit according to the first embodiment.

FIG. 13 is a flow diagram showing an example of the operation flow of the waveform determination unit 106 according to the first embodiment. As shown in FIG. 13, the waveform determination unit 106 inputs waveform data of the detection object waveform output from the waveform extraction unit 105 in step S61. Then, the waveform determination unit 106 determines whether or not the detection object waveform is an abnormal waveform by using the abnormality detection algorithms AL[2] by machine-learning learned in advance, and determines whether or not the manufacturing device has an abnormality. Then, the waveform determination unit 106 outputs an abnormality detection result indicating whether or not the manufacturing device has the abnormality to the outside of the device.

The learning data for generating the abnormality detection algorithm AL[2] is prepared by collecting waveform data output from the waveform extraction unit 105. As the abnormality detection algorithm AL[2], for example, there is a method using a auto encoder. Hereinafter, the flow after step S62 will be described on the assumption that an auto encoder is used as the abnormality detection algorithm AL[2].

The waveform determination unit 106 inputs the waveform data of the detection object waveform output from the waveform extraction unit 105 to the auto encoder using the abnormality detection algorithm AL[2], and calculates the degree of deviation of the waveform data of the input and output of the auto encoder (step S62).

Subsequently, the waveform determination unit 106 determines whether or not the degree of deviation is equal to or less than the second degree of deviation threshold (step S63), and when the degree of deviation is equal to or less than the second degree of deviation threshold (Yes in step S63), determines that the detection object waveform is a normal waveform and the manufacturing device is normal (step S64), and when the degree of deviation exceeds the second degree of deviation threshold (No in step S63), determines that the detection object waveform is an abnormal waveform and the manufacturing device is abnormal (step S65).

Next, the waveform determination unit 106 outputs an abnormality detection result indicating whether or not the manufacturing device is abnormal to the outside of the device (step S66). Thereafter, the process returns to step S61.

Figure 14:
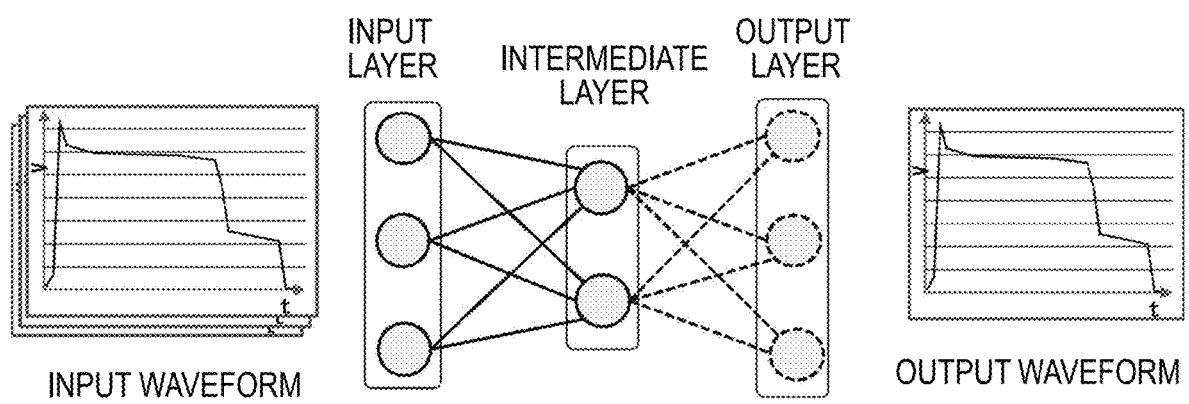
FIG. 14 is a diagram showing an exemplary auto encoder used in the waveform determination unit according to the first embodiment.

FIG. 14 is a diagram showing an exemplary auto encoder used in the waveform determination unit 106 according to the first embodiment. As shown in FIG. 14, the auto encoder is composed of an input layer, one or more intermediate layers (in the example of FIG. 14, one intermediate layer), and an output layer having the same number of nodes as the input layer. The auto encoder is a method of learning the feature points compressed by the error back propagation method so that the input data and the output data become equal. Therefore, when waveform data equivalent to the learning data is input to the input layer, the same waveform data is reproduced on the output layer. Conversely, when waveform data that has not been learned is input to the input layer, the same waveform data cannot be reproduced, and thus the waveform data differs between the input and the output.

In the example of FIG. 14, the auto encoder uses the waveform data of the detection object waveform as the learning data, and learns the characteristic points of the waveform data of the detection object waveform so that the same waveform data is reproduced in the output layer when waveform data equivalent to the learning data is input to the input layer.

Effect of First Embodiment

In first embodiment, first, the waveform determination unit 104 determines whether or not a detection object waveform is included in time series waveform data having the number of points being larger than the number of points in the detection object waveform, from the detection target device. When the waveform determination unit 104 determines that the waveform data includes the detection object waveform, the waveform extraction unit 105 extracts the detection object waveform from the waveform data. The waveform determination unit 104 determines whether or not the detection target device has an abnormality, based on the waveform data of the detection object waveform outputted from the waveform extraction unit 105.

Therefore, even if the waveform data outputted from the waveform extraction unit 103 includes a mixture of a waveform other than the detection object waveform and the non-detection object waveform, only the detection object waveform can be extracted without erroneously determining the non-detection object waveform as the detection object waveform, and abnormality detection of the detection target device can be performed. When the waveform data output from the waveform extraction unit 103 does not include a detection object waveform, the waveform extraction unit 105 does not perform extraction processing of the detection object waveform, so that the amount of calculation can be suppressed.

The waveform determination units 104 and 106 perform the above-described processing by using an algorithm obtained by learning waveform data including a detection object waveform.

In this instance, as the learning data used in the waveform determination unit 104, a small number (at least one set) of waveform data obtained by manually cutting out only the detection object waveform is prepared, and the waveform data obtained by randomly shifting the cut-out detection object waveform in the time axis direction within the range of the length of about twice the detection object waveform is used. When there are variations in the amplitude direction and the time axis direction of the waveform data of the detection object waveform, the waveform data expanded and contracted randomly in the amplitude direction and the time axis direction, respectively, is also set as the learning data. Therefore, it is not necessary for the engineer to manually extract and collect a large amount of learning data used in the waveform determination unit 104, and the engineer can reduce the labor and time.

The learning data used in the waveform determination unit 106 is collected from the waveform data output from the waveform extraction unit 105. Therefore, the learning data used in the waveform determination unit 106 can be efficiently prepared.

Second Embodiment

Configuration and Operation of Second Embodiment

In second embodiment, as compared to the first embodiment described above, the configuration itself is similar, but the operation of the waveform determination unit 104 is different.

In the above-described first embodiment, the waveform determination unit 104 calculates the degree of deviation of the waveform data of the input and output of the auto encoder, and when the degree of deviation is equal to or less than a predetermined first degree of deviation, determines that the waveform data input to the auto encoder includes the detection object waveform.

On the other hand, in the second embodiment, the waveform determination unit 104 uses an arithmetic value such as a normalized error $(|(x(i)-y(i)|/(|x(i)|+\alpha)$ between the waveform data $x(i)$ inputted to the auto encoder and the waveform data $y(i)$ outputted from the auto encoder, where $\alpha$ is an optional constant for excluding division by 0. The waveform determination unit 104 determines that the detection object waveform is included in the waveform data when the normalization error is continuously equal to or less than a predetermined error threshold by a predetermined number.

Further, when it is determined that the waveform data includes the detection object waveform, the waveform determination unit 104 may instruct the waveform extraction unit 105 to exclude a range other than a range in which the normalization error is consecutively equal to or less than the error threshold value by a predetermined number from the range in which the detection object waveform is extracted. As a result, it is possible to reduce the possibility that the waveform extraction unit 105 erroneously extracts the non-detection object waveform.

Figure 15:
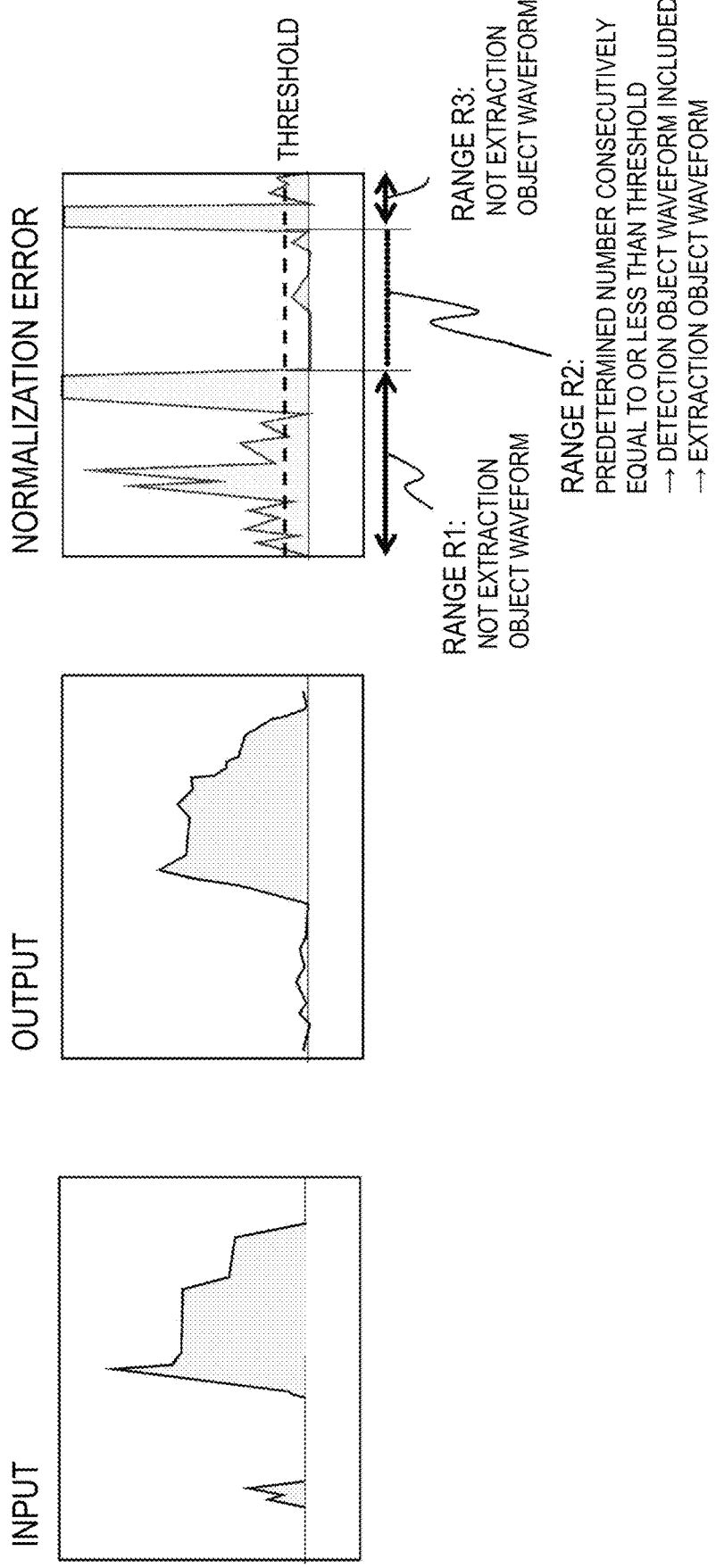
FIG. 15 is a diagram showing an exemplary operation of the waveform determination unit according to the second embodiment.

FIG. 15 is a diagram showing an exemplary operation of the waveform determination unit 104 according to the second embodiment. A left side in FIG. 15 shows waveform data at the input of the auto encoder, the center in FIG. 15 shows waveform data at the output of the auto encoder, and a right side in FIG. 15 shows a normalization error between waveform data at the input of the auto encoder and waveform data at the output.

In the example of the right side in FIG. 15, there is a range R2 in which a predetermined number of normalization errors are consecutively equal to or less than the error threshold. Therefore, the waveform determination unit 104 determines that the detection object waveform is included in the range R2 of the waveform data. Further, the waveform determination unit 104, since it was determined that the detection object waveform is included in the range R2, the range R2 is a range to extract the detection object waveform, the range R1, R3 other than the range R2, to exclude from the range to extract the detection object waveform, instruct the waveform extraction unit 105.

Effects of Second Embodiment

In the above-described first embodiment, the waveform determination unit 104 determined that when the deviation of the waveform data between the input and output of the auto encoder is less than a predetermined first deviation threshold value, the waveform data includes the detection object waveform. Therefore, in the range in which the detection object waveform is extracted by the waveform extraction unit 105, there is a concern that when the waveform variation of the detection object waveform is included, it is erroneously determined that the detection object waveform is included, or when the detection object waveform includes a large abnormal portion, it is erroneously determined that the detection object waveform is not included.

On the other hand, in the second embodiment, the waveform determination unit 104 determines that the waveform data includes the detection object waveform when the normalization error between the waveform data inputted to the auto encoder and the waveform data outputted from the auto encoder continuously becomes equal to or less than the predetermined error threshold by a predetermined number. Therefore, when the waveform variation of the non-detection object waveform is included, the influence of the waveform fluctuation appears largely as a normalization error, so that it can be correctly determined that the detection object waveform is not included. In addition, since the determination is performed based on the continuity of the normalization error in a predetermined section, even when a large abnormal portion is included in the detection object waveform, it can be correctly determined that the detection object waveform is included. The rest of the effects are the same as those of the above-mentioned first embodiment.

Third Embodiment

The first embodiment described above assumes that the detection object waveform is one, the third embodiment assumes that there are a plurality of detection object waveforms that differ from each other.

Configuration of Third Embodiment

This third embodiment, as compared to the first embodiment described above, although the configuration itself is the same, the object waveform detection algorithm AL[1] used in the waveform determination unit 104 and the abnormality detection algorithm AL[2] used in the waveform determination unit 106 differ.

The object waveform detection algorithm AL[1] used in the waveform determination unit 104 is configured by a classification type neural network such as a convolution neural network. The object waveform detection algorithm AL[1] calculates, for each of a plurality of detection object waveforms, the probability that the detection object waveform is included in the waveform data by a soft max function or the like. The object waveform detection algorithm AL[1] determines that the detection object waveform is included in the waveform data when there is a detection object waveform whose calculated probability exceeds a predetermined probability threshold (for example, 70%). On the other hand, the object waveform detection algorithm AL[1] determines that none of the plurality of detection object waveforms is included in the waveform data when there is no detection object waveform whose calculated probability exceeds the probability threshold.

The learning data for the object waveform detection algorithm AL[1] generates learning data for each of a plurality of detection object waveforms by the method described using FIG. 5. The detection result of detection object waveform includes a result indicating whether or not the detection object waveform is included, and when the detection object waveform is included, information identifying the detection object waveform. The detection result of the detection object waveform is output to the waveform extraction unit 105 and the waveform determination unit 106.

The waveform determination unit 106 holds a plurality of abnormality detection algorithms AL[2] corresponding to each of the plurality of detection object waveforms, switches the abnormality detection algorithm AL[2] according to the detection result of the detection object waveform, and determines whether or not the manufacturing device is abnormal using the switched abnormality detection algorithm AL[2].

Operation of the Third Embodiment

Figure 16:
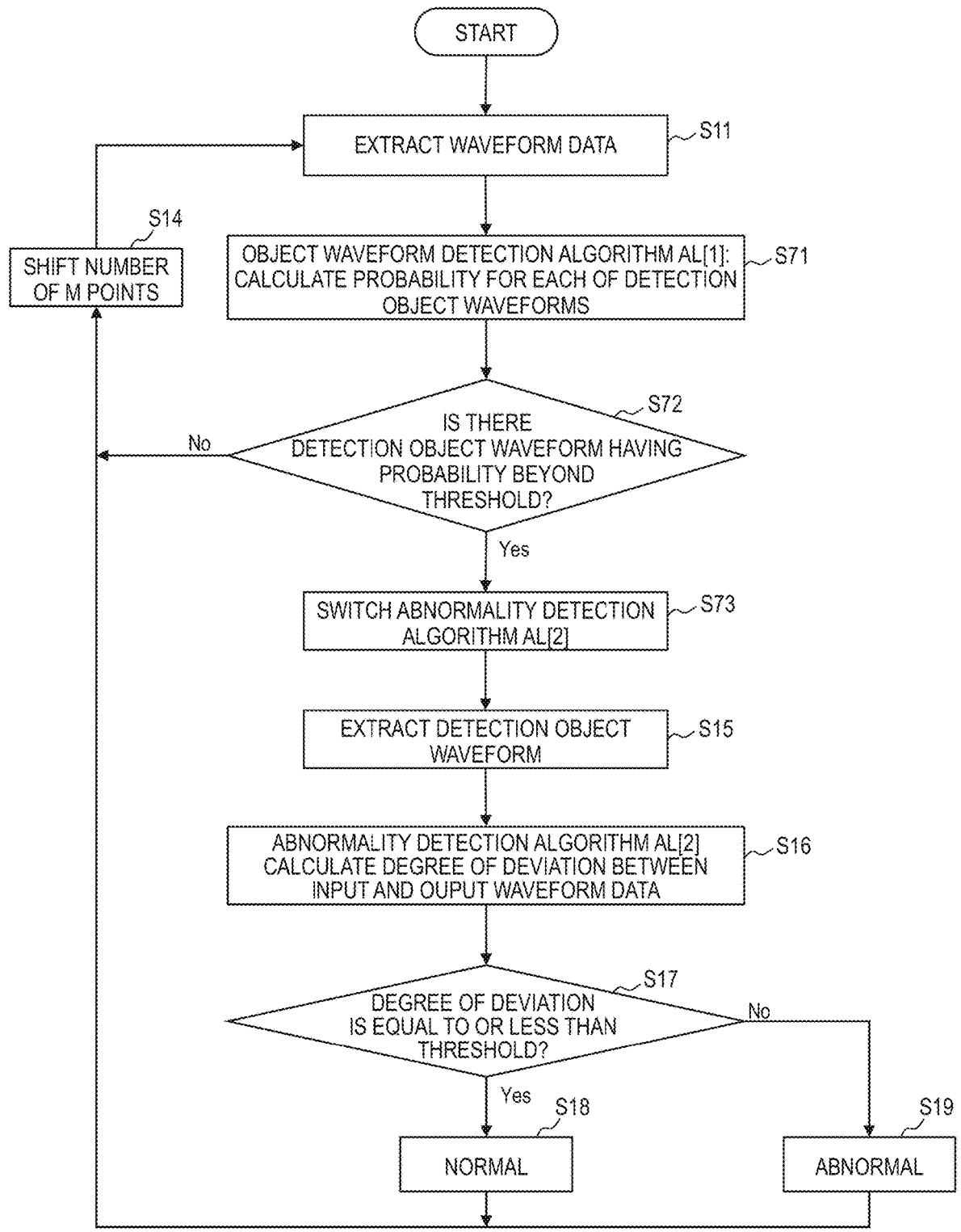
FIG. 16 is a flow chart showing an exemplary flow of an abnormality detection process performed by the entire abnormality detection device related to third embodiment.

FIG. 16 is a flow diagram showing an example of the flow of the abnormal detection process performed by the entire abnormality detection device according to the present third embodiment. Hereinafter, differences from the flow chart of FIG. 4 relating to the above-described first embodiment will be mainly described.

As shown in FIG. 16, when the waveform data is extracted and output by the waveform extraction unit 103 in step S11, the waveform determination unit 104 calculates the probability that the detection object waveform is included in the waveform data output from the waveform extraction unit 103 for each of a plurality of detection object waveforms using the object waveform detection algorithm AL[1] (step S71). In step S72, the waveform determination unit 104 determines whether there is a detection object waveform whose calculated probability exceeds a probability threshold.

If there is no detection object waveform whose probability exceeds the probability threshold (No in step S72), the waveform determination unit 104 determines that none of the plurality of detection object waveforms is included in the waveform data, and returns to the process of step S11 via step S14.

On the other hand, when there is a detection object waveform whose probability exceeds the probability threshold value (Yes in step S72), the waveform determination unit 104 determines that the detection object waveform is included in the waveform data, and the waveform determination unit 106 performs switching to the abnormality detection algorithm AL[2] according to the detection object waveform (step S73). The subsequent process is the same as the flow chart of FIG. 4 relating to the above-described first embodiment.

Effects of Third Embodiment

In third embodiment, the waveform determination unit 104 calculates the probability of the detection object waveform being included in the wave data for each of the plurality of detectable target waves using the object waveform detection algorithms AL [1] composed of a classification-type neural network, and determines whether or not any of the plurality of detection object waveforms is included based on whether the calculated probability exceeds a predetermined probability threshold value. When the waveform determination unit 104 determines that any of the plurality of detection object waveforms is included, the waveform determination unit 106 switches the abnormality detection algorithm AL[2] according to the determined detection object waveform, and determines whether or not the detection object waveform is an abnormal waveform.

Therefore, even when there are a plurality of detection object waveforms, it is possible to extract a plurality of detection object waveforms, respectively, and perform abnormality detection of the detection target device. The rest of the effects are the same as those of the above-mentioned first embodiment.

Fourth Embodiment

The fourth embodiment is an embodiment of an abnormality detection system using one of the abnormality detection devices according to the above-described first to third embodiments.

Configuration and Operation of Fourth Embodiment

Figure 17:
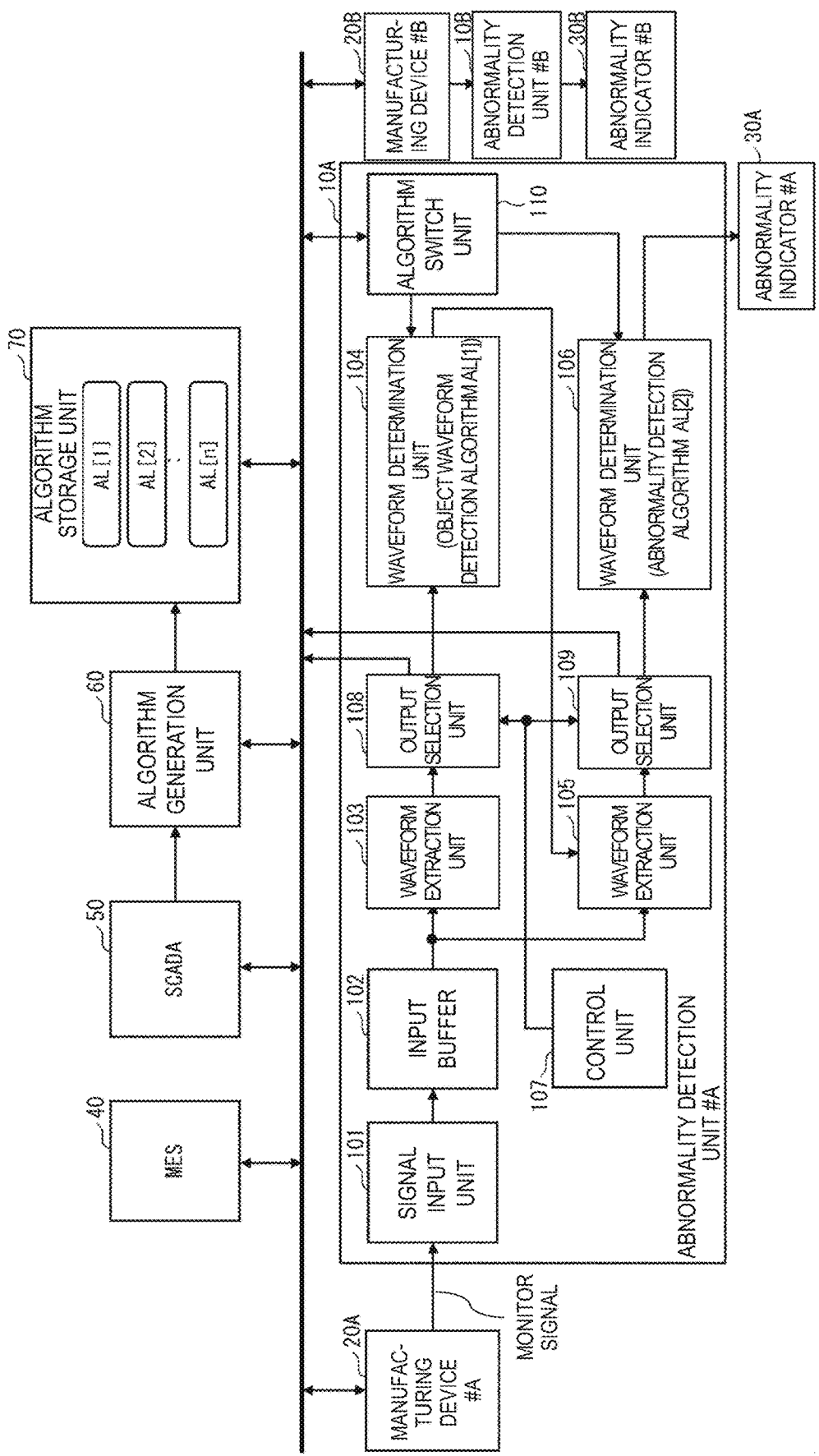
FIG. 17 is a diagram showing an exemplary configuration of an abnormality detection system according to the fourth embodiment.

FIG. 17 is a diagram showing an exemplary configuration of an abnormality detection system according to the fourth embodiment. As shown in FIG. 17, the abnormality detection system according to the fourth embodiment includes abnormality detection devices 10A and 10B corresponding to any one of abnormality detection device according to the first to the third embodiment, manufacturing devices 20A and 20B, abnormality indicators 30A and 30B, MES (Manufacturing Execution Systems) 40, SCADA (Supervisory Control and Data Acquisition) 50, an algorithm generation unit 60, and an algorithm storage unit 70. The SCADA 50 is an exemplary data collection unit. Further, in the drawings described below, the abnormality detection device 10A and 10B are also denoted by abnormality detection device # A and abnormality detection device # B, respectively, the manufacturing device 20A and 20B are also denoted by manufacturing device # A and manufacturing device # B, respectively, and the abnormality indicators 30A and 30B are also denoted by abnormality indicator # A and abnormality indicator # B, respectively.

The manufacturing device 20A is, for example, a manufacturing device for manufacturing semiconductors. The abnormality detection device 10A determines whether or not abnormality occurs on the manufacturing device 20A, based on the monitor signals inputted from the manufacturing device 20A, and outputs an abnormality detection result indicating whether or not abnormality occurs on the manufacturing device 20A to the abnormality indicator 30A. The abnormality indicator 30A displays the abnormality detection result of the manufacturing device 20A. Note that the relationships among the manufacturing device 20B, the abnormality detection device 10B, and the abnormality indicator 30B are the same as the relationships among the manufacturing device 20A, the abnormality detection device 10A, and the abnormality indicator 30A.

In this fourth embodiment, the algorithm generation unit 60 generates the object waveform detection algorithm AL[1] used by the waveform determination unit 104, and generates the abnormality detection algorithm AL[2] used by the waveform determination unit 106.

When generating the object waveform detection algorithm AL[1], the output selection unit 108 outputs the waveform data output from the waveform extraction unit 103 to the SCADA50, and the SCADA50 collects the waveform data output from the output selection unit 108 and outputs it to the algorithm generating unit 60. The algorithm generation unit 60 extracts a detection object waveform from waveform data including a detection object waveform among the waveform data outputted from the SCADA50 in the manner described with reference to FIG. 5, generates learning data while randomly shifting the extracted detection object waveform, and generates the object waveform detection algorithm AL[1] using the generated learning data.

When the abnormality detection algorithm AL[2] is generated, the output selection unit 109 outputs the waveform data of the detection object waveform output from the waveform extraction unit 105 to the SCADA50, and the SCADA50 collects the waveform data of the detection object waveform output from the output selection unit 109 and outputs it to the algorithm generating unit 60. The algorithm generation unit 60 generates the abnormality detection algorithm AL[2] using the waveform data of the normal waveform among the waveform data of the detection object waveform outputted from the SCADA50 as the learning data.

The algorithm storage unit 70 stores various algorithms including the object waveform detection algorithm AL[1] and the abnormality detection algorithm AL[2] generated by the algorithm generation unit 60.

The abnormality detection device 10A includes the same components as those in FIG. 1 related to the above-described first embodiment, and additionally includes an algorithm switch unit 110. In order to switch the object waveform detection algorithm AL[1] used by the waveform determination unit 104, the algorithm switch unit 110 reads a new object waveform detection algorithm AL[1] from the algorithm storage unit 70, and causes the waveform determination unit 104 to hold it. In order to switch the abnormality detection algorithm AL[2] used in the waveform determination unit 106, the algorithm change unit 110 reads out a new abnormality detection algorithm AL[2] from the algorithm storage unit 70 and causes the waveform determination unit 106 to hold it. The configuration of the abnormality detection device 10B is the same as the configuration of the abnormality detection device 10A.

Effects of Fourth Embodiment

In the fourth embodiment, the algorithm generating unit 60 generates learning data for a object waveform detection algorithm AL[1], and generates a object waveform detection algorithm AL[1] and abnormality detection algorithm AL[2] using the learning data.

Therefore, compared with the first embodiment where the engineer managing the manufacturing device 20A or 20B generates learning data or algorithms, the labor and time of the engineer can be reduced. The rest of the effects are the same as those of the above-mentioned first embodiment.

Fifth Embodiment

Configuration and Operation of Fifth Embodiment

Figure 18:
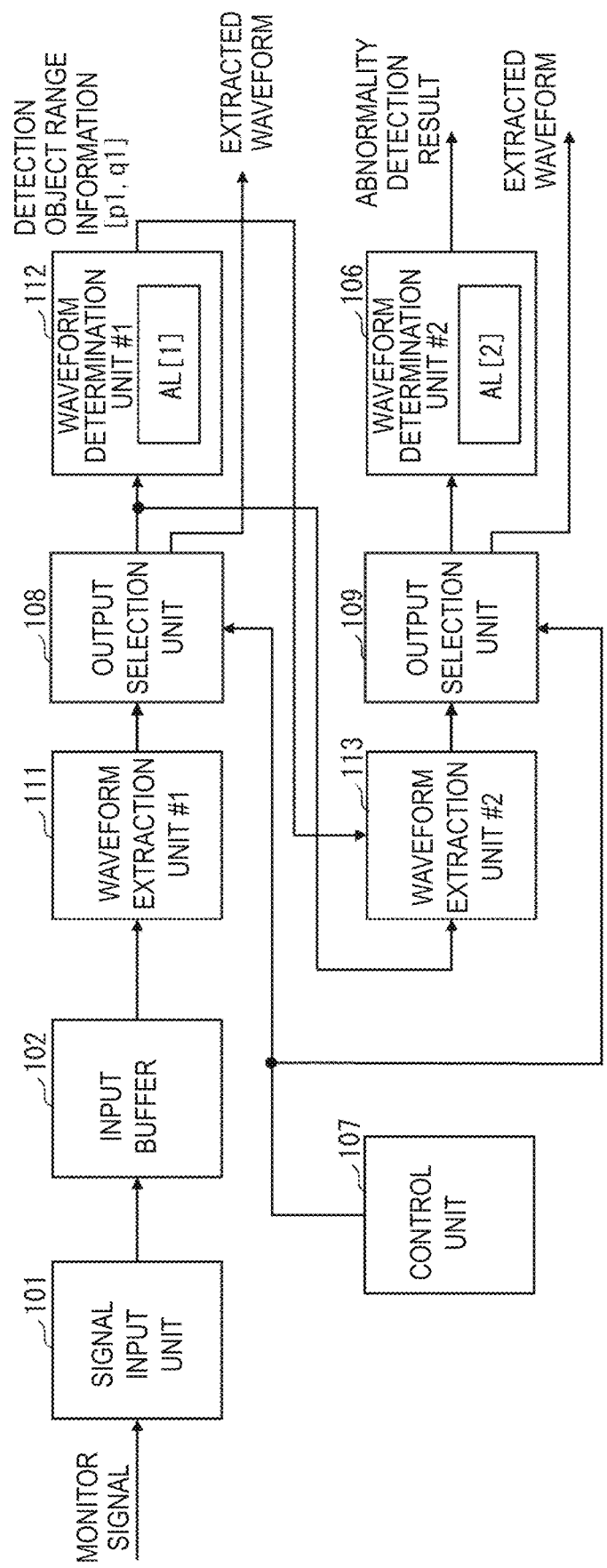
FIG. 18 is a diagram showing an exemplary configuration of an abnormality detection device related to fifth embodiment.

FIG. 18 is a diagram illustrating an exemplary configuration of an abnormality detection device according to the fifth embodiment. Note that FIG. 18 shows only the main components constituting the abnormality detection device, and omits other components. As shown in FIG. 18, the abnormality detection device according to the present fifth embodiment differs from the above-described first embodiment in that the waveform extraction unit 103, the waveform determination unit 104, and the waveform extraction unit 105 are replaced with a waveform extraction unit 111, a waveform determination unit 112, and a waveform extraction unit 113. The waveform extraction unit 113 also differs from the above-described first embodiment in that waveform data is input from the waveform extraction unit 111 via the output selection unit 108, instead of waveform data being input from the input buffers 102. The waveform extraction unit 111 is an example of a first waveform extraction unit, the waveform determination unit 112 is an example of a first waveform determination unit, and the waveform extraction unit 113 is an example of a second waveform extraction unit. In the drawings described below, the waveform extraction units 111 and 113 are also denoted by waveform extraction units #1 and #2, respectively, and the waveform determination unit 112 is also denoted by waveform determination unit #1.

Figure 19:
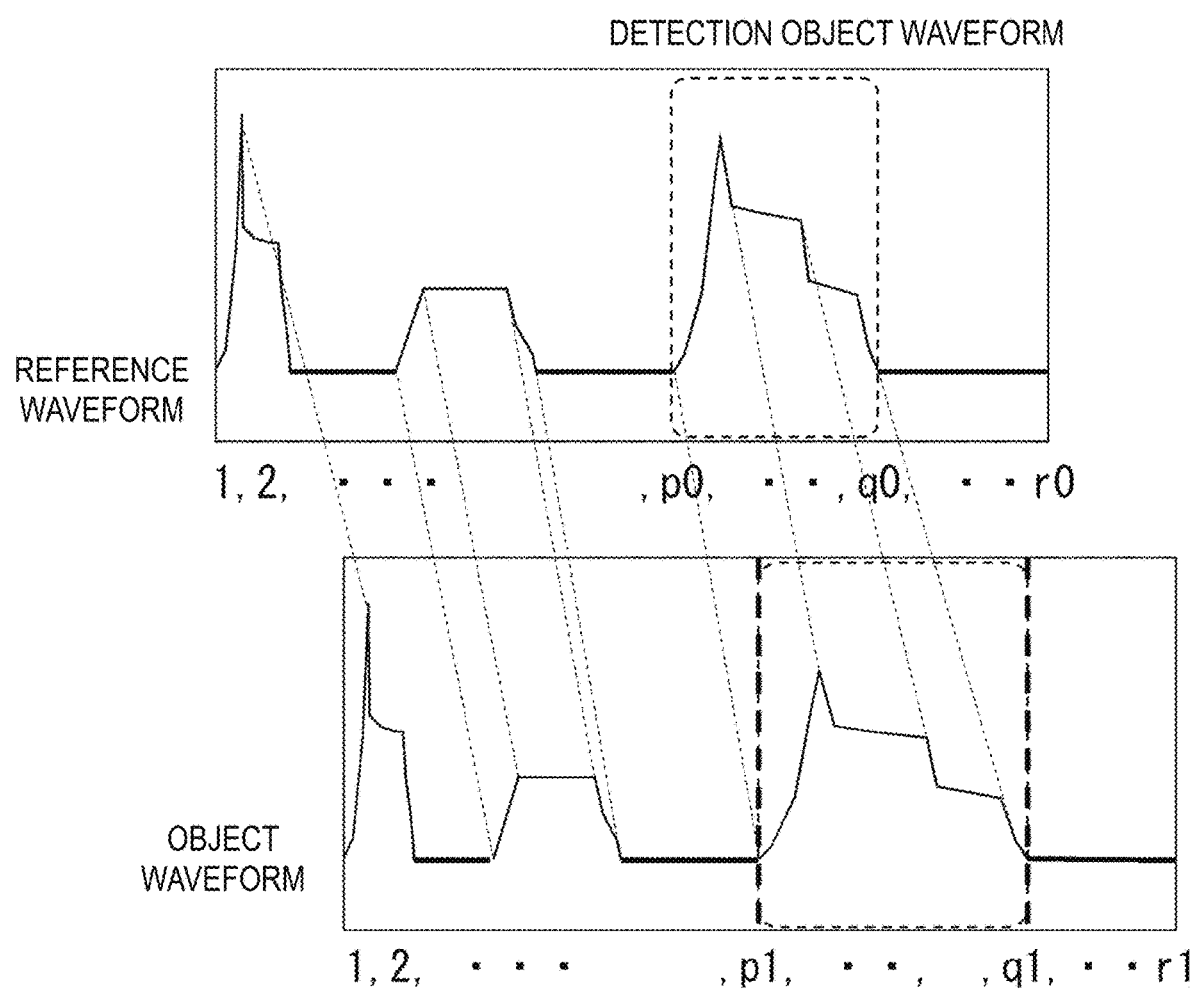
FIG. 19 is an image diagram illustrating an exemplary process of extracting a detection object waveform by the waveform extraction unit according to the fifth embodiment.

FIG. 19 is an image diagram illustrating an exemplary detection object waveform extraction process by the waveform extraction unit 113 according to the fifth embodiment. The waveform determination unit 112 uses an algorithm using a Dynamic Time Warping (DTW) method as the object waveform detection algorithm AL[1]. When the waveform determination unit 112 uses the DTW method as the object waveform detection algorithm AL[1], it is necessary to acquire reference waveform data.

First, the process of obtaining reference waveform data for the DTW method will be described. The waveform extraction unit 111 extracts the waveform data corresponding to the r0 point from the point at which the amplitude level of the waveform data output from the input buffer 102 exceeds the start trigger level. Here, the trigger condition for determining the start point is not limited to the case where the trigger level is exceeded, and, for example, an external trigger signal condition not included in FIG. 19 may be considered. In order to sufficiently include the detection object waveform in the waveform data having the r0 points, when the number of points of the detection object waveform is L, r0 is set to a value sufficiently larger than L. The engineer who manages the abnormality detection target device specifies the range [p0, q0] of the detection object waveform from the waveform data of r0 points extracted by the waveform extraction unit 111, based on the knowledge of the engineer or the like. Here, p0 represents a start point and q0 represents an end point. Then, the object waveform detection algorithm AL[1] is given in advance as reference waveform data, information indicating that the waveform data output from the waveform extraction unit 111 is waveform data having r0 points and information indicating the range [p0, q0] of the detection object waveform included in the waveform data for r0 points.

Next, the process of extracting the detection object waveform will be described. The waveform extraction unit 111 extracts waveform data in a predetermined range from a point where the amplitude level of the waveform data output from the input buffer 102 exceeds the start trigger level as a starting point, and outputs the extracted waveform data to the waveform determination unit 112 and the waveform extraction unit 113 through the output selection unit 108. Here, it is assumed that the waveform data corresponding to the r1 point is extracted from the starting point. Here, r1=r0, or r1>r0 or r1<r0. Depending on the waveform data, the waveform extraction unit 111 may extract the waveform data from the start point to the end point at which the amplitude level of the waveform data is lower than the end trigger level.

As the object waveform detection algorithm AL[1], the waveform determination unit 112 uses the DTW method to determine the correspondence between the reference waveform data and the waveform data output from the waveform extraction unit 111 (hereinafter, referred to as target waveform data) so that the distance (cost) between two points at each point of the object waveform data and the reference waveform data is minimized. Subsequently, the range of the target waveform data [p1, q1] corresponding to the range of the reference waveform data [p0, q0] is determined as the range of the detection object waveform. Then, the waveform determination unit 112 outputs detection object range information indicating the range [p1, q1] of the detection object waveform to the waveform extraction unit 113.

In this instance, the waveform determination unit 112 may confirm the validity of the range [p1, q1] determined as the detection object waveform. As a method of confirming the validity, for example, the Euclidean distance between the reference waveform data and the target waveform data for a predetermined number of points (e.g., 20 points) after the start point of the range of the detection object waveform is calculated. Further, the Euclidean distance between the reference waveform data and the target waveform data is calculated by using a predetermined number of points (for example, 20 points) before the end point of the range of the detection object waveform. If both Euclidean distances are smaller than a predetermined distance threshold, e.g., 0.5 or less, the range of the detection object waveform may be determined to be appropriate, and if any of the Euclidean distances is equal to or larger than the distance threshold, the range of the detection object waveform may be determined to be inappropriate. In addition, the detection object range information may be output to the waveform extraction unit 113 only when the range of the detection object waveform is appropriate, and the object waveform data may be discarded and the detection object range information may not be output to the waveform extraction unit 113 when the range of the detection object waveform is not appropriate.

The waveform extraction unit 113 extracts a waveform in the range [p1, q1] of the detection object waveform from the waveform data output from the waveform extraction unit 111 as the detection object waveform, based on the detection target section information, and outputs the waveform data of the extracted detection object waveform to the waveform determination unit 106 via the output selection unit 109. Similar to the above-described first embodiment, the waveform determination unit 106 can detect an abnormality in the manufacturing device by using the abnormality detection algorithms AL[2].

Effect of Fifth Embodiment

In the fifth embodiment, the waveform determination unit 112, as an object waveform detection algorithm AL[1], uses the DTW method to determine the range [p1,q1] of the detection object waveform included in the r1 points of the waveform data, and the waveform extraction unit 113 extracts the waveform in the range [p1,q1] of the detection object waveform from the r1 points of the waveform data as the detection object waveform.

Therefore, the waveform extraction unit 113 can accurately extract the detection object waveform without using the trigger condition or the like. The rest of the effects are the same as those of the above-mentioned first embodiment.

In the fifth embodiment, it is assumed that a detection object waveform is included in the waveform data within a predetermined range from the point where the amplitude level of the waveform data exceeds the starting trigger level, but there are concerns that the detection object waveform is not included depending on the waveform data. Therefore, the waveform extraction unit 111 and the waveform determination unit 112 may be provided at the subsequent stage of the waveform determination unit 104 of the above-mentioned first embodiment. The waveform extraction unit 111 and the waveform determination unit 112 may perform the above-mentioned processes with respect to the waveform data determined by the waveform determination unit 104 to include the detection object waveform to obtain the range [p1, q1] of the detection object waveform.

Sixth Embodiment

Sixth embodiment, like the third embodiment described above, assumes that there are a plurality of detection object waveforms which differ from each other. In the following description, it is assumed that there are two detection object waveforms.

Configuration and Operation of the Sixth Embodiment

Figure 20:
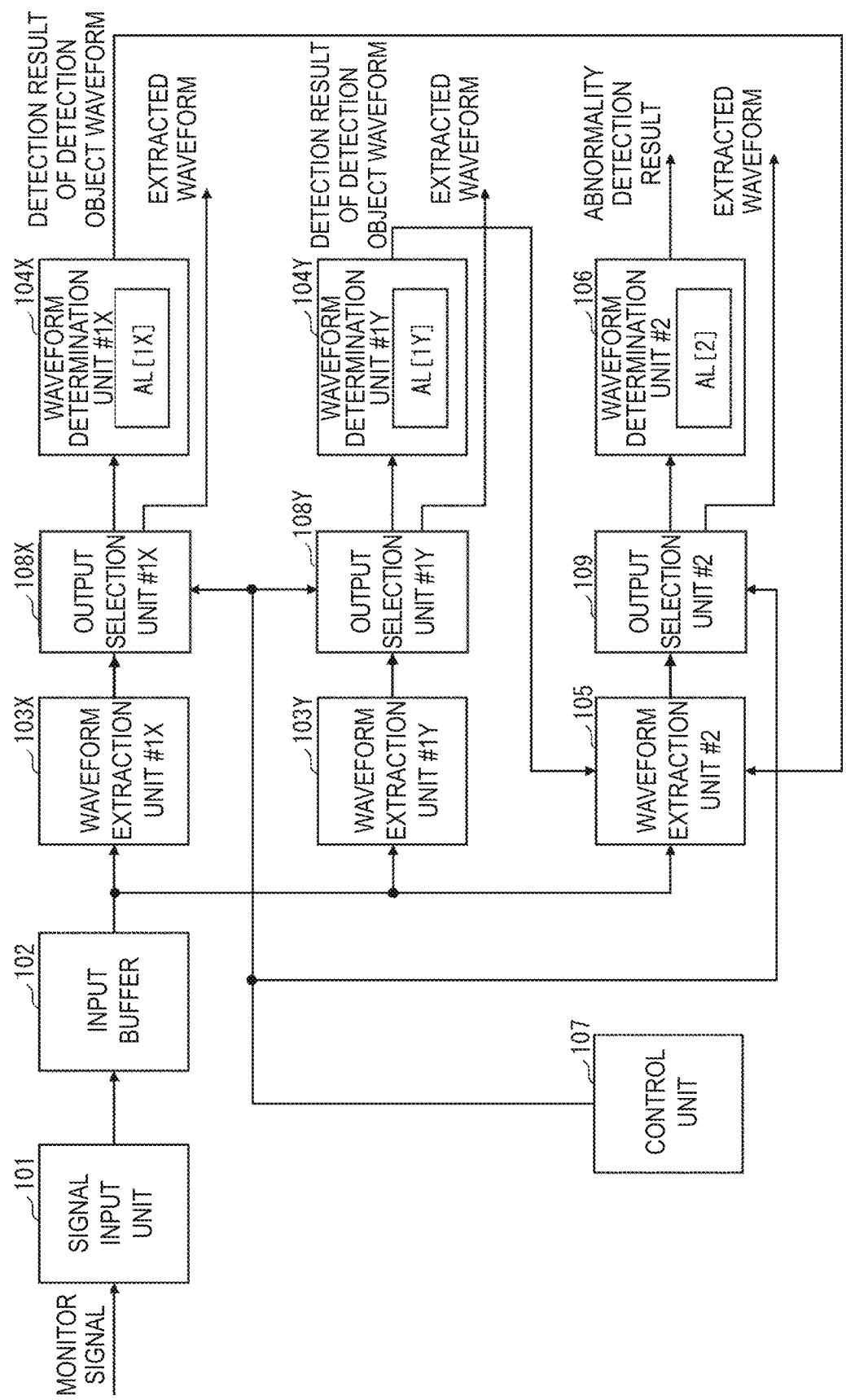
FIG. 20 is a diagram showing an exemplary configuration of an abnormality detection device according to sixth embodiment.

FIG. 20 is a diagram showing an example of the configuration of the abnormality detection device according to the sixth embodiment. Note that FIG. 20 shows only the constituent elements of the main part constituting the abnormality detection device, and omits other constituent elements. As shown in FIG. 20, the abnormality detection device according to the sixth embodiment has a configuration in which two sets of the waveform extraction unit 103, the output selection unit 108, and the waveform determination unit 104 are provided corresponding to the two detection object waveforms, respectively, as compared with the above-described first embodiment. That is, instead of the waveform extraction unit 103, the output selection unit 108, and the waveform determination unit 104, a first set of waveform extraction unit 103X, output selection unit 108X, and waveform determination unit 104X, and a second set of waveform extraction unit 103Y, output selection unit 108Y, and waveform determination unit 104Y are provided. The waveform extraction units 103X and 103Y are examples of the first waveform extraction unit, and the waveform determination units 104X and 104Y are examples of the first waveform determination unit. In the drawings described below, the waveform extraction units 103X and 103Y are also denoted as a waveform extraction unit #1X,#1Y, the waveform determination units 104X and 104Y, and the waveform determination unit #1X,#1Y, respectively, and the output selection units 108X and 108Y are also denoted as an output selection unit #1X,#1Y, respectively.

Figure 21:
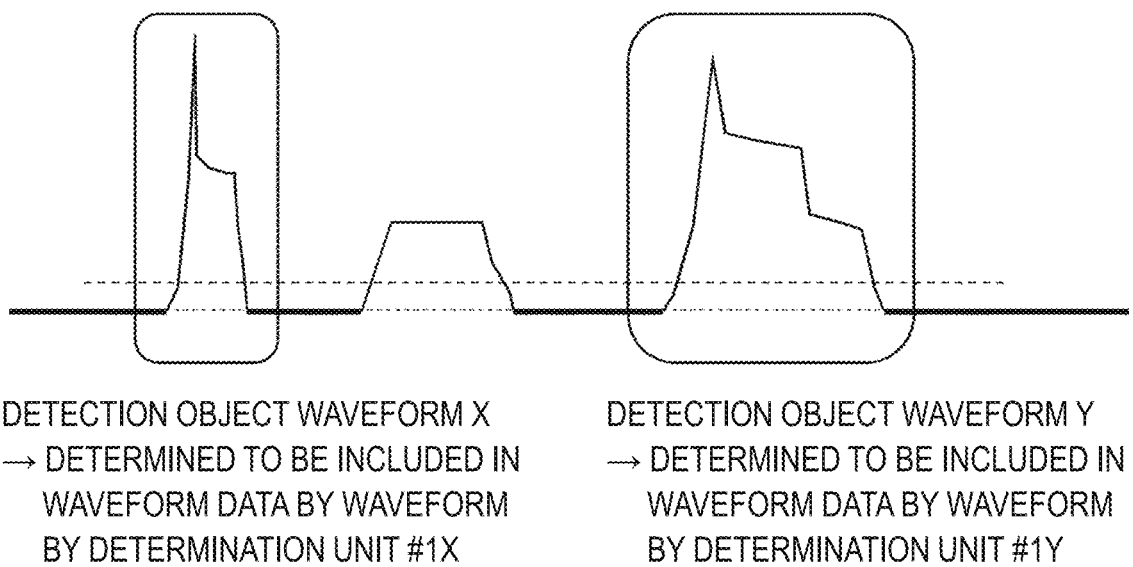
FIG. 21 is an image diagram showing an example of a determination process by the waveform determination units 104X and 104Y according to the sixth embodiment.

FIG. 21 is an image diagram illustrating an exemplary process of determining whether or not a detection object waveform is included by the waveform determination units 104X and 104Y according to the sixth embodiment. The first set of waveform extraction unit 103X, output selection unit 108X, and waveform determination unit 104X are provided to determine whether or not one of the two detection object waveforms (hereinafter, referred to as detection object waveform X) is included in the waveform data output from the input buffer 102.

The second set of waveform extraction unit 103Y, output selection unit 108Y, and waveform determination unit 104Y are provided to determine whether or not the waveform data output from the input buffer 102 includes the other of the two detection object waveforms, hereinafter referred to as the detection object waveform Y.

In the example of FIG. 21, the waveform data output from the input buffer 102 includes two detection object waveforms X and Y. Therefore, the waveform determination unit 104X determines that the waveform data includes the detection object waveform X, and the waveform determination unit 104Y determines that the waveform data includes the detection object waveform Y.

In this instance, the waveform determination units 104X and 104Y can determine that two detection object waveforms X and Y are included, respectively, at substantially the same time. Therefore, the waveform extraction unit 105 can extract the two detection object waveforms X and Y substantially simultaneously from the waveform data. However, the present invention is not limited thereto, and the waveform extraction unit 105 may extract two detection object waveforms X and Y separately.

In the sixth embodiment, there are two detection object waveforms. Therefore, the waveform determination unit 106 holds two abnormality detection algorithms AL[2] corresponding to each of the two detection object waveforms, similarly to the above-described third embodiment, and switches the two abnormality detection algorithms AL[2] according to the detection result of the detection object waveform and uses them.

In sixth embodiment, two examples of detection object waveforms are described, but three or more detection object waveforms may be used. In this case as well, a set of the waveform extraction unit 103, the output selection unit 108, and the waveform determination unit 104 may be provided for the number of detection object waveforms.

Effect of Sixth Embodiment

In the sixth embodiment, a set of the waveform extraction unit 103, the output selection unit 108, and the waveform determination unit 104 are provided plurality corresponding to each of the plurality of detection object waveforms, each set of the waveform determination unit 104 determines whether the corresponding detection object waveform is included in the waveform data.

Therefore, even when there are a plurality of detection object waveforms, it is possible to extract a plurality of detection object waveforms, respectively, and perform abnormality detection of the detection target device. In addition, it is possible to determine that a plurality of detection object waveforms are included in the waveform data at substantially the same time, and to extract them at substantially the same time. The rest of the effects are the same as those of the above-mentioned first embodiment.

Figure 22:
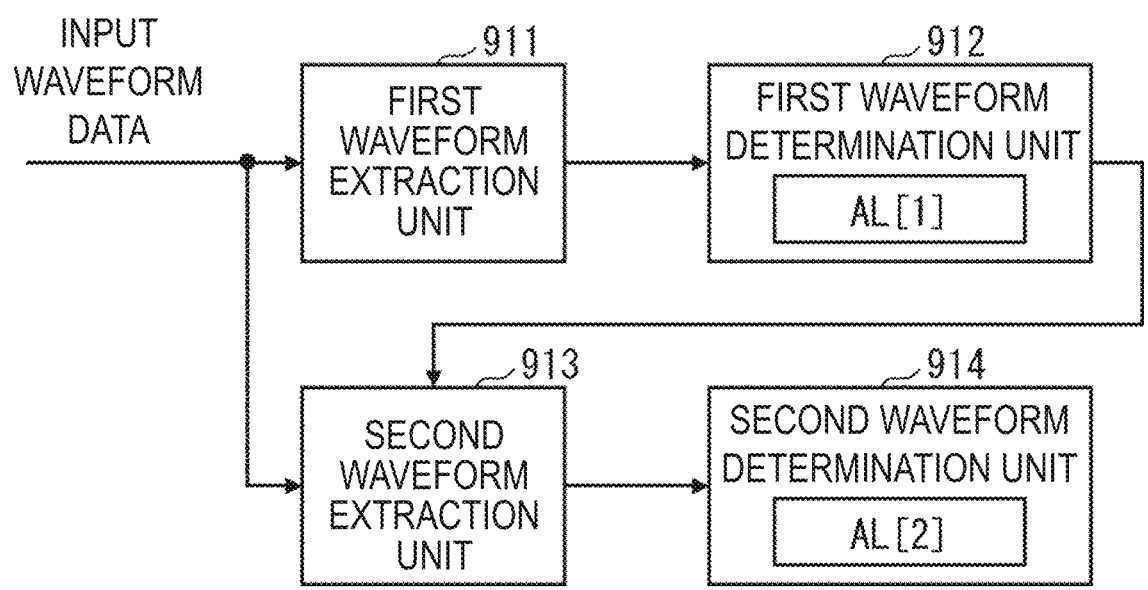
FIG. 22 is a diagram showing an exemplary configuration of an abnormality detection device conceptually showing the first to the third embodiment, the fifth and the sixth embodiments.

Concepts of the First to the Third Embodiment, the Fifth and the Sixth Embodiments FIG. 22 is a diagram showing an example of a configuration of the abnormality detection device that conceptually shows the above-described first to third embodiment, and fifth and sixth embodiments. The abnormality detection device shown in FIG. 22 includes a first waveform extraction unit 911, a first waveform determination unit 912, a second waveform extraction unit 913, and a second waveform determination unit 914.

The first waveform extraction unit 911 inputs the time-series waveform data outputted from the detection target device, and outputs the input waveform data for the number of points larger than the detection object waveform. At this time, the first waveform extraction unit 911 may output the input waveform data as it is, or may output the input waveform data after the number of points is thinned out. The first waveform extraction unit 911 corresponds to the waveform extraction units 103, 103X, 103Y, and 111.

The first waveform determination unit 912 determines whether or not the detection object waveform is included in the input waveform data output from the first waveform extraction unit 911, using the first algorithm AL[1]. The first waveform determination unit 912 corresponds to the waveform determination units 104, 104X, 104Y, and 112. The first algorithm AL[1] corresponds to the object waveform detection algorithm AL[1].

The second waveform extraction unit 913 receives input waveform data, and extracts and outputs a detection object waveform from the input waveform data when the first waveform determination unit 912 determines that the detection object waveform is included in the input waveform data. The second waveform extraction unit 913 corresponds to the waveform extraction units 105 and 113.

The second waveform determination unit 914 determines whether or not the detection object waveform outputted from the second waveform extraction unit 913 is an abnormal waveform by using the second algorithm AL[2], and determines whether or not the detection target device is abnormal. The second waveform determination unit 914 corresponds to the waveform determination unit 106. The second algorithm AL[2] corresponds to the abnormality detection algorithm AL[2].

Concepts of the Fourth Embodiment

Figure 23:
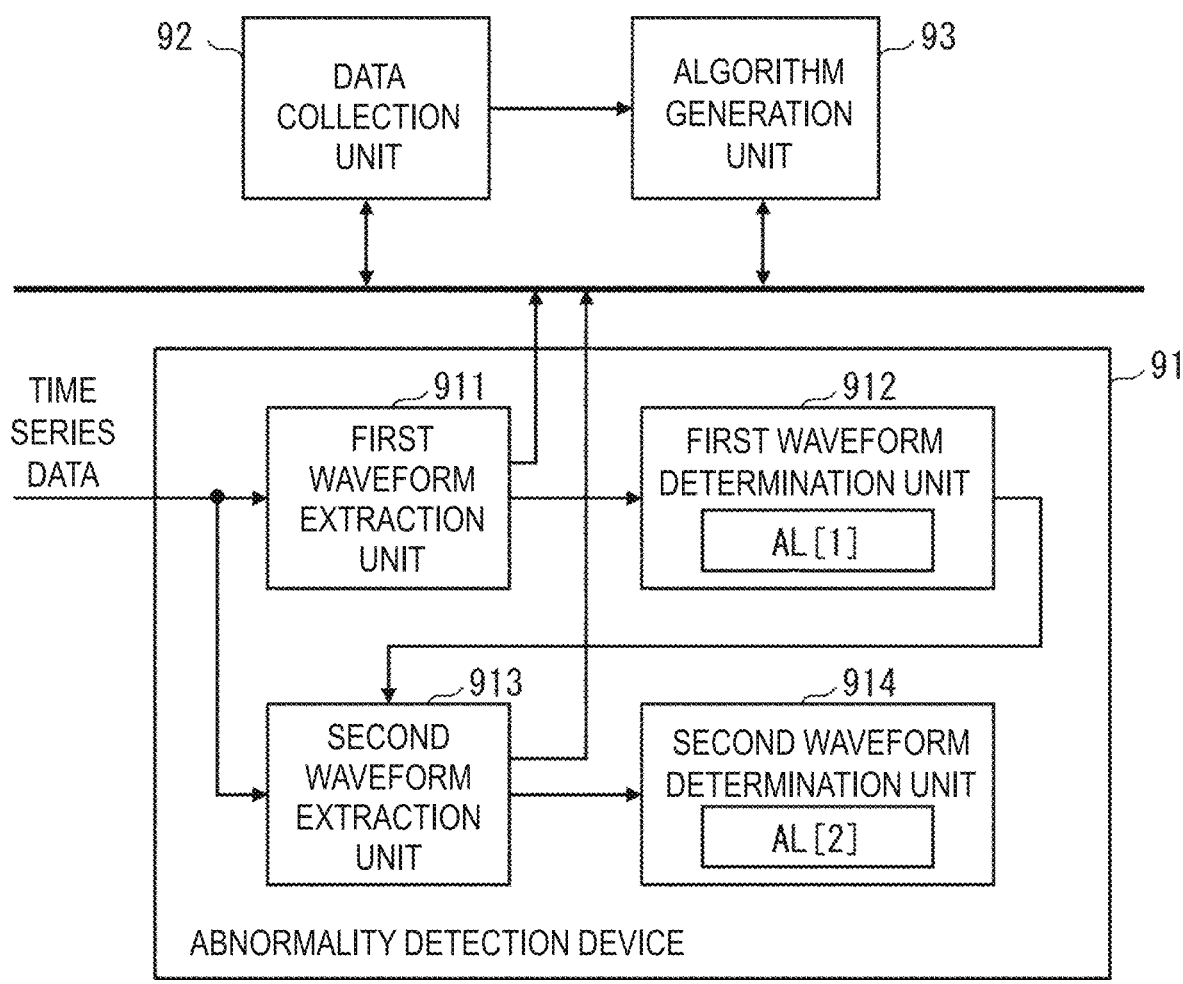
FIG. 23 is a diagram showing an exemplary configuration of an abnormality detection system conceptually showing the fourth embodiment.

FIG. 23 is a diagram showing an example of a configuration of the abnormal detection system conceptually showing the above-described fourth embodiment. The abnormality detection system shown in FIG. 23 includes an abnormality detection device 91, a data collection unit 92, and an algorithm generation unit 93.

The abnormality detection device 91 corresponds to an abnormality detection device shown in FIG. 22. The data collection unit 92 collects the input waveform data output from the first waveform extraction unit 911 and the waveform data of the detection object waveform output from the second waveform extraction unit 913, and outputs them to the algorithm generation unit 93. The data collection unit 92 corresponds to a SCADA50.

The algorithm generation unit 93 generates the first learning data using the input waveform data including the detection object waveform among the input waveform data output from the data collection unit 92, and generates the first algorithm AL[1] using the first learning data. In addition, the algorithm generation unit 93 generates the second algorithm AL[2] by using the waveform data of the normal waveform of the detection object waveform as the second learning data, out of the waveform data of the detection object waveform output from the data collection unit 92. The algorithm generation unit 93 corresponds to the algorithm generation unit 60. The first learning data corresponds to the learning data for the object waveform detection algorithm AL[1]. The second learning data corresponds to the learning data for the abnormality detection algorithm AL[2].

Figure 24:
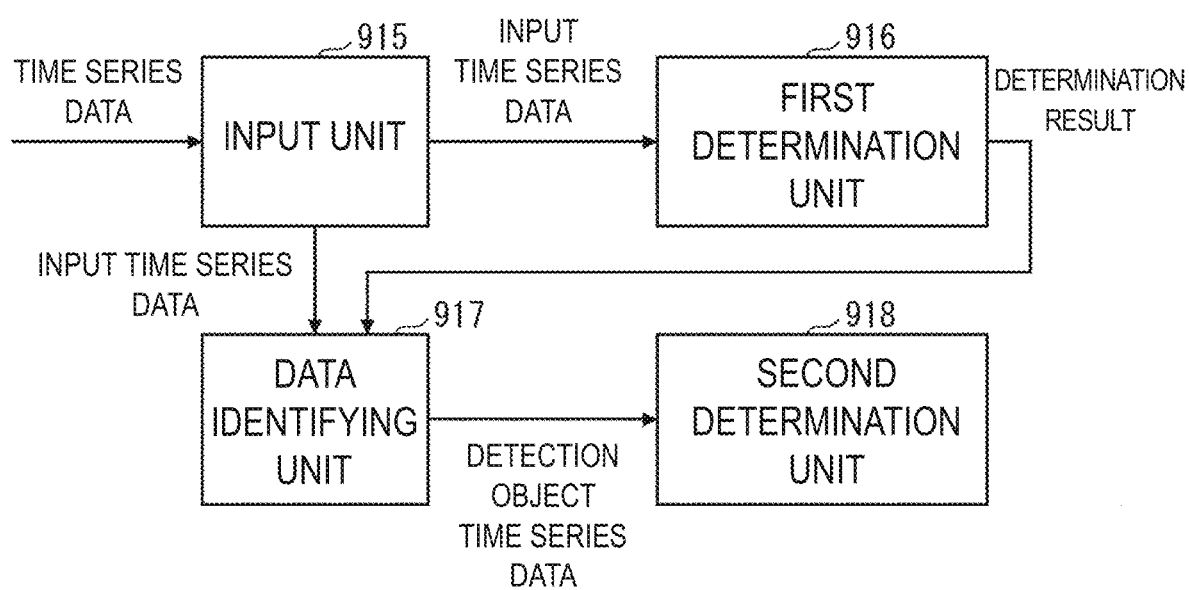
FIG. 24 is a diagram showing another exemplary configuration of an abnormality detection device conceptually showing the first to the third embodiment, the fifth and the sixth embodiments.

Other Concepts of the First to the Third Embodiment, the Fifth and the Sixth Embodiments FIG. 24 is a diagram showing examples of other structures of the abnormality detection device that conceptually show the above-described first to third embodiment, fifth and sixth embodiments. The abnormality detection device shown in FIG. 24 includes an input unit 915, a first determination unit 916, a data identifying unit 917, and a second determination unit 918.

The input unit 915 receives time series data, extracts time series data of a predetermined period from the input time series data, and outputs the extracted time series data as input time series data. The input unit 915 corresponds to the input buffer 102.

The first determination unit 916 determines whether or not the input time series data includes time series data to be detected. This determination may be made based on a first algorithm using a neural network technique. The first determination unit 916 corresponds to the waveform determination units 104, 104X, 104Y, and 112. The first algorithm corresponds to the object waveform detection algorithm AL[1].

When the input time series data is input and the determination result by the first determination unit 916 indicates that the input time series data includes data to be detected, the data identifying unit 917 identifies time series data corresponding to the data to be detected from the input time series data, and outputs the identified time series data as detection object time series data. The detection object time series data may be data having a period shorter than a predetermined period. The data identifying unit 917 corresponds to the waveform extraction units 105 and 113.

The second determination unit 918 determines whether or not the detection object time series data is data indicating an abnormality. This determination may be made based on a second algorithm using a neural network technique. The second determination unit 918 corresponds to the waveform determination unit 106. The second algorithm corresponds to the abnormality detection algorithm AL[2].

Although the invention made by the inventor has been specifically described based on the embodiment, the present invention is not limited to the embodiment already described, and it is needless to say that various modifications can be made without departing from the gist thereof.

For example, in the above-described embodiment, the output selection unit is provided in the subsequent stage of the waveform extraction unit, and the control unit for controlling the output selection unit is provided, but the present embodiment is not limited thereto. For example, the waveform extraction unit may have a function of autonomously switching the output destination, in which case the output selection unit and the control unit are unnecessary.

In the above-described embodiment, it is assumed that the detection target device for detecting an abnormality is a manufacturing device such as a manufacturing device for semiconductor device, but the present embodiment is not limited thereto. The detection target device may be a device other than the manufacturing device.

What is claimed is:

1. An abnormality detection device for detecting an abnormality in a manufacturing device for a semiconductor device, the abnormality detection device comprising:

an input circuit configured to extract time series data in a predetermined period from time series data input to the input circuit, to generate reduced-resolution waveform data by selecting one point for every fixed number of points in the extracted time series data, and to output the time series data in the predetermined period as an input time series data, wherein the reduced-resolution waveform data reduces a number of data points for subsequent analysis to suppress computation load and power consumption;

a first determination circuit configured to determine whether time series data to be detected is included in the input time series data;

a data identifying circuit configured to, in response to the first determination circuit determining that the time series data to be detected is included in the input time series data, identify detection object time series data from the input time series data by aligning the input time series data to a reference waveform using Dynamic Time Warping (DTW), and to validate a range of the input time series data aligned to the reference waveform as the detection object time series data when similarity criteria at both a start portion and an end portion of the range satisfy a predetermined threshold condition for increasing accuracy of identifying the detection object time series data and for reducing a likelihood of falsely identifying non-matching waveform segments as the detection object time series data, and to discard the detection object time series data otherwise;

a second determination circuit configured to determine whether the detection object time series data indicates an abnormality of the manufacturing device;

a data collection circuit configured to collect the input time series data from the input circuit and the detection object time series data from the data identifying circuit; and an algorithm generation circuit configured to generate first learning data based on the collected input time series data including the collected detection object waveform data, to generate second learning data based on the detection object time series data indicating a normality, and to generate a first algorithm and a second algorithm by using the first learning data and the second learning data, respectively, wherein the first determination circuit performs determination using the first algorithm, and the second determination circuit performs determination using the second algorithm.

2. The abnormality detection device according to claim 1, wherein the first determination circuit determines whether the time series data to be detected is included in the input time series data based on a first algorithm using a first neural network, and the second determination circuit determines whether the detection object time series data indicates the abnormality based on a second algorithm using a second neural network.

3. The abnormality detection device according to claim 1, wherein a period of the detection object time series data is shorter than the predetermined period of the input time series data.

4. An abnormality detection system for detecting an abnormality in a manufacturing device for a semiconductor device, the abnormality detection system comprising:
- a first extraction circuit configured to receive waveform data from the manufacturing device, to extract waveform data in a predetermined period from the received waveform data, and to generate reduced-resolution waveform data by selecting one point for every fixed number of points in the extracted waveform data, wherein the reduced-resolution waveform data reduces a number of data points for subsequent analysis to suppress computation load and power consumption, and to output the extracted waveform data as input waveform data;
- a first determination circuit configured to determine whether detection object waveform data is included in the input waveform data by using a first algorithm generated based on the input waveform data including detection object waveform data;
- a second extraction circuit configured to, in response to determining that the detection object waveform data is included in the input waveform data, align the input waveform data to a reference waveform using Dynamic Time Warping (DTW), validate a range of the aligned waveform as the detection object waveform data when similarity criteria at both a start portion and an end portion of the range satisfy a predetermined threshold condition for increasing accuracy of identifying the detection object waveform data and for reducing a likelihood of false detection, and discard the detection object waveform data otherwise;
- a second determination circuit configured to determine whether the validated detection object waveform data indicates an abnormality of the manufacturing device by using a second algorithm generated based on detection object waveform data indicating a normality;
- a data collection circuit configured to collect the input waveform data from the first extraction circuit and the detection object waveform data from the second extraction circuit; and
- an algorithm generation circuit configured to generate the first algorithm and the second algorithm based on the collected input waveform data and detection object waveform data.

5. The abnormality detection system according to claim 4, wherein the first determination circuit determines whether the detection object waveform data is included in the input waveform data using a first algorithm based on a first learning data,
wherein the second determination circuit determines whether the extracted detection object waveform data indicates an abnormality using a second algorithm based on a second learning data,
wherein the first learning data is generated based on the input waveform data including the detection object waveform data out of the input waveform data extracted by the first extraction circuit, and
wherein the second learning data is generated based on the detection object waveform data determined as a normality out of the detection object waveform data extracted by the second extraction circuit.

6. The abnormality detection system according to claim 4, wherein the first extraction circuit thins the waveform data to generate the input waveform data, and
wherein the first extraction circuit determines whether the detection object waveform data is included in the input waveform data which is thinned waveform data.

7. The abnormality detection system according to claim 4, wherein the first determination circuit determines whether the detection object waveform data is included in the input waveform data using a first algorithm using a first auto encoder, calculates a degree of deviation between the input waveform data to be input to the first auto encoder and the output data of the first auto encoder, and determines whether the detection object waveform data is included in the input waveform data based on the degree of deviation.

8. The abnormality detection system according to claim 4, wherein the first determination circuit determines whether the detection object waveform data is included in the input waveform data using a first algorithm using a first auto encoder, calculates a normalized error between the input waveform data to be input to the first auto encoder and the output data of the first auto encoder, and determines that the detection object waveform data is included in the input waveform data based on the normalized error.

9. The abnormality detection system according to claim 8, wherein the first determination circuit generates detection object range information which indicates a range corresponding to the detection object waveform data in the input waveform data, and
wherein the second extraction circuit extracts the detection object waveform data based on the detection object range information.

10. The abnormality detection system according to claim 4,
wherein the first determination circuit determines a type of the detection object waveform data by using an algorithm of a classification type neural network,
wherein the second determination circuit includes a plurality of abnormality detection algorithm for the type of the detection object waveform data, switches the abnormality detection algorithm according to determined type of the detection object waveform data, and determines whether the extracted detection object waveform data indicates abnormal by using the abnormality detection algorithm.

11. The abnormality detection system according to claim 4,
wherein the first determination circuit includes a reference waveform data, and determines a correspondence between the input waveform data and the reference waveform data by using Dynamic time warping method to generate a detection object range information which indicate a range corresponding to the detection object waveform data from the input waveform data, and
wherein the second extraction circuit extracts the detection object waveform data based on the detection object range information.

12. The abnormality detection system according to claim 11, wherein the first determination circuit notifies the range corresponding to the detection object waveform data, when the first determination circuit determines that the range is valid.

13. The abnormality detection system according to claim 4, wherein the detection object waveform includes a plurality of detection object waveforms which are different from each other, and
wherein a plurality of sets of the first extraction circuit and the first determination circuit are provided corresponding to each of the plurality of detection object waveforms, and each first determination circuit determines whether a corresponding detection object waveform is included in the input waveform data.

14. The abnormality detection system according to claim 4, wherein the second determination circuit uses a second algorithm using a second auto encoder, calculates a degree of deviation between the extracted detection object waveform data to be input to the second auto encoder and the output data of the second auto encoder, and determines whether the detection object waveform data which is extracted by the second extraction circuit indicates abnormal.

15. The abnormality detection system according to claim 4, wherein the algorithm generation circuit extracts the detection object waveform data from the input waveform data, uses waveform data obtained by shifting the extracted detection object waveform data in a time axis direction within a range where the number of points is larger than the extracted detection object waveform data as the first learning data.

16. The abnormality detection system according to claim 4, wherein the algorithm generation circuit further generates waveform data obtained by expanding or contracting the detection object waveform data including the shifted detection object waveform data in an amplitude direction or a time axis direction, as the first learning data.

17. An abnormality detection method for detecting an abnormality in a manufacturing device for a semiconductor device, the abnormality detection method comprising:
inputting input waveform data being a time series waveform data output from the manufacturing device for the semiconductor device;
generating reduced-resolution waveform data by selecting one point for every fixed number of points in the input waveform data, the reduced-resolution waveform data reducing a number of data points for subsequent analysis to suppress computation load and power consumption;
generating first learning data based on the input waveform data including the detection object waveform data;
generating a first algorithm using the first learning data;
determining whether time series data to be detected is included in the input waveform data using the first algorithm;
in response to determining that the time series data to be detected is included in the input waveform data, identifying detection object waveform data by aligning the input waveform data to a reference waveform using Dynamic Time Warping (DTW), validating a range of the aligned waveform as the detection object waveform data when similarity criteria at both a start portion and an end portion of the range satisfy a predetermined threshold condition for increasing accuracy of identifying the detection object waveform data and for reducing a likelihood of false detection, and discarding the detection object waveform data otherwise;
generating second learning data based on the detection object waveform data indicating a normality;
generating a second algorithm using the second learning data; and
determining whether the detection object waveform data indicates an abnormality of the manufacturing device using the second algorithm.

18. The abnormality detection device according to claim 1, wherein a period of the detection object time series data is shorter than the predetermined period of the input time series data.

19. The abnormality detection system according to claim 4, wherein a period of the detection object waveform data is shorter than the predetermined period of the input waveform data.

20. The abnormality detection method according to claim 17, wherein a period of the detection object waveform data is shorter than the predetermined period of the input waveform data.

* * * * *